(12) United States Patent
Nammi et al.

(10) Patent No.: US 11,374,715 B2
(45) Date of Patent: *Jun. 28, 2022

(54) ADAPTIVE DEMODULATION REFERENCE SIGNALS IN WIRELESS COMMUNICATION SYSTEMS

(71) Applicant: AT&T Intellectual Property I, L.P., Atlanta, GA (US)

(72) Inventors: SaiRamesh Nammi, Kista (SE); Xiaoyi Wang, Austin, TX (US); Arunabha Ghosh, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 87 days.

This patent is subject to a terminal disclaimer.

(21) Appl. No.: 17/038,839

(22) Filed: Sep. 30, 2020

(65) Prior Publication Data

US 2021/0028903 A1 Jan. 28, 2021

Related U.S. Application Data

(63) Continuation of application No. 16/145,264, filed on Sep. 28, 2018, now Pat. No. 10,833,823.

(51) Int. Cl.
*H04W 72/04* (2009.01)
*H04L 5/00* (2006.01)
(Continued)

(52) U.S. Cl.
CPC .......... *H04L 5/0048* (2013.01); *H04L 1/1812* (2013.01); *H04L 5/0055* (2013.01);
(Continued)

(58) Field of Classification Search
CPC ... H04L 5/0048; H04L 1/1812; H04L 5/0055; H04L 25/0202; H04L 27/2649;
(Continued)

(56) References Cited

U.S. PATENT DOCUMENTS 9,609,647 B2 3/2017 You et al.
9,648,588 B2 5/2017 Kim et al.
(Continued)

FOREIGN PATENT DOCUMENTS

WO 2018/69257 A1 4/2018

OTHER PUBLICATIONS

International Search Report and Written Opinion received for PCT Application Serial No. PCT/US2019/047582 dated Oct. 29, 2019, 15 pages.

(Continued)

*Primary Examiner* — Edan Orgad
*Assistant Examiner* — Malick A Sohrab
(74) *Attorney, Agent, or Firm* — Amin, Turocy & Watson, LLP

(57) ABSTRACT

The described technology is generally directed towards adapting the demodulation reference signal sent in a wireless resource data block based on channel estimation performance. In general, if the demodulation reference signal received was not successfully able to be used to demodulate the resource data block, the demodulation reference signal density can be increased up to a maximum density, which costs resource elements but improves the channel estimation accuracy. If the demodulation reference signal received was able to be used to demodulate the resource data block, the demodulation reference signal density can be decreased down to minimum density, which saves resource elements for data. The network device can use HARQ ACK/NACK data (e.g., a current count or counted over a time period) to determine channel estimation performance, and/or the user equipment can recommend a demodulation reference signal density change.

20 Claims, 16 Drawing Sheets

(51) Int. Cl.
*H04L 1/18* (2006.01)
*H04L 25/02* (2006.01)
*H04L 27/26* (2006.01)
*H04B 7/0413* (2017.01)

(52) U.S. Cl.
CPC ...... *H04L 25/0202* (2013.01); *H04L 27/2649* (2013.01); *H04B 7/0413* (2013.01); *H04L 5/0007* (2013.01)

(58) Field of Classification Search
CPC ... H04L 5/0007; H04L 5/001; H04L 27/2611; H04L 5/0051; H04L 5/0085; H04L 5/0094; H04L 25/0226; H04B 7/0413
See application file for complete search history.

(56) References Cited

U.S. PATENT DOCUMENTS

| | | | |
|---|---|---|---|
| 9,893,853 B2 | 2/2018 | Yi et al. | |
| 9,930,666 B2 | 3/2018 | Wang et al. | |
| 9,936,486 B2* | 4/2018 | You | H04W 72/0413 |
| 10,085,256 B2 | 9/2018 | Chen et al. | |
| 10,090,980 B2 | 10/2018 | Nammi et al. | |
| 2008/0081635 A1* | 4/2008 | Jonsson | H04L 1/203 |
| | | | 455/452.2 |
| 2014/0219237 A1 | 8/2014 | Charbit et al. | |
| 2015/0282123 A1* | 10/2015 | Miao | H04L 5/0051 |
| | | | 455/450 |
| 2016/0057753 A1* | 2/2016 | Yang | H04L 5/0085 |
| | | | 370/336 |
| 2016/0157118 A1 | 6/2016 | Liu et al. | |
| 2016/0211959 A1* | 7/2016 | Jöngren | H04L 5/0051 |
| 2018/0123849 A1 | 5/2018 | Si et al. | |
| 2018/0199343 A1 | 7/2018 | Deogun et al. | |
| 2018/0270799 A1 | 9/2018 | Noh et al. | |
| 2020/0106584 A1* | 4/2020 | Jiang | H04L 1/0016 |

OTHER PUBLICATIONS

Ericsson, "Frame structure and DMRS positions", 3GPP TSG-RAN WG1 #86, R1-167079, Aug. 22-25, 2016, 6 pages.
Non-Final Office Action received for U.S. Appl. No. 16/145,264 dated Nov. 7, 2019, 50 pages.
Final Office Action received for U.S. Appl. No. 16/145,264 dated Mar. 31, 2020, 56 pages.
Notice of allowance received for U.S. Appl. No. 16/145,264 dated Aug. 27, 2020, 47 pages.
International Preliminary Report on Patentability for International Application No. PCT/US2019/047582 dated Apr. 8, 2021, 8 pages.
U.S. Appl. No. 16/145,264, filed Sep. 28, 2018.

* cited by examiner

ADAPTIVE DEMODULATION REFERENCE SIGNALS IN WIRELESS COMMUNICATION SYSTEMS

RELATED APPLICATION

The subject patent application is a continuation of, and claims priority to, U.S. patent application Ser. No. 16/145,264, filed Sep. 28, 2018, and entitled "ADAPTIVE DEMODULATION REFERENCE SIGNALS IN WIRELESS COMMUNICATION SYSTEMS," the entirety of which application is hereby incorporated by reference herein.

TECHNICAL FIELD

The subject application is related to wireless communication systems, and, for example, to the transmission of demodulation reference signals in an orthogonal frequency-division multiplexing (OFDM) wireless communication system.

BACKGROUND

In wireless communication systems, including New Radio (NR, sometimes referred to as 5G) and likely beyond, user equipment computes channel estimates based on pilot or reference signals. For example, downlink reference signals are predefined signals occupying specific resource elements within the downlink time-frequency grid. There are different types of downlink reference signals that are transmitted in different ways and used for different purposes by the receiving terminal, including channel-state information reference signals (CSI-RS) and demodulation reference signals (DM-RS, or DMRS, without the hyphen).

Demodulation reference signals, also sometimes referred to as UE-specific reference signals, are specifically intended to be used by terminals for channel estimation for the data channel. The label "UE-specific" relates to the fact that each demodulation reference signal is intended for channel estimation by a single terminal. That specific reference signal is then only transmitted within the resource blocks assigned for data traffic channel transmission to that terminal.

When demodulation reference signals are transmitted within a resource block, the data traffic channel mapping to the time-frequency grid of the resource block needs to be modified to avoid the resource elements in which the reference signals are transmitted. This results in a lesser number of resources for the data traffic channel. However, there is a tradeoff, because reducing the number of resource elements for the demodulation reference signals can impact the quality of the channel estimation for demodulation.

BRIEF DESCRIPTION OF THE DRAWINGS

The technology described herein is illustrated by way of example and not limited in the accompanying figures in which like reference numerals indicate similar elements and in which.

DETAILED DESCRIPTION

Briefly, one or more aspects of the technology described herein are generally directed towards adapting the density of demodulation reference signals (DM-RS) in resource blocks, wherein the demodulation reference signals are used to estimate the channel. In general, when the channel estimation performance is poor, e.g., as determined via one or more negative acknowledgements (NACKs), the density of demodulation reference signals is increased (up to some maximum number of resource elements in the resource block, such as doubled) for a next data channel transmission. When the channel estimation performance is good, e.g., as determined via one or more positive acknowledgements (ACKs), the density of demodulation reference signals is decreased (down to some minimum number of resource elements in the resource block, such as halved) for a next data channel transmission.

As a result, the number of resource elements used for the demodulation reference signals are adapted based on the channel estimation performance, whereby resource elements used for the demodulation reference signals are not unnecessarily used when good channel estimation performance exists. At times the use of adaptive demodulation reference signal densities as described herein requires a lesser number of resources, while at other times this does not compromise the channel estimation performance for data demodulation because an increased density is used when needed.

It should be understood that any of the examples and terms used herein are non-limiting. For instance, some examples are based on New Radio (NR, sometimes referred to as 5G) communications between a user equipment exemplified as a smartphone or the like and network device; however virtually any communications devices may benefit from the technology described herein, and/or their use in different spectrums may likewise benefit. Thus, any of the embodiments, aspects, concepts, structures, functionalities or examples described herein are non-limiting, and the technology may be used in various ways that provide benefits and advantages in radio communications in general.

Figure 1:
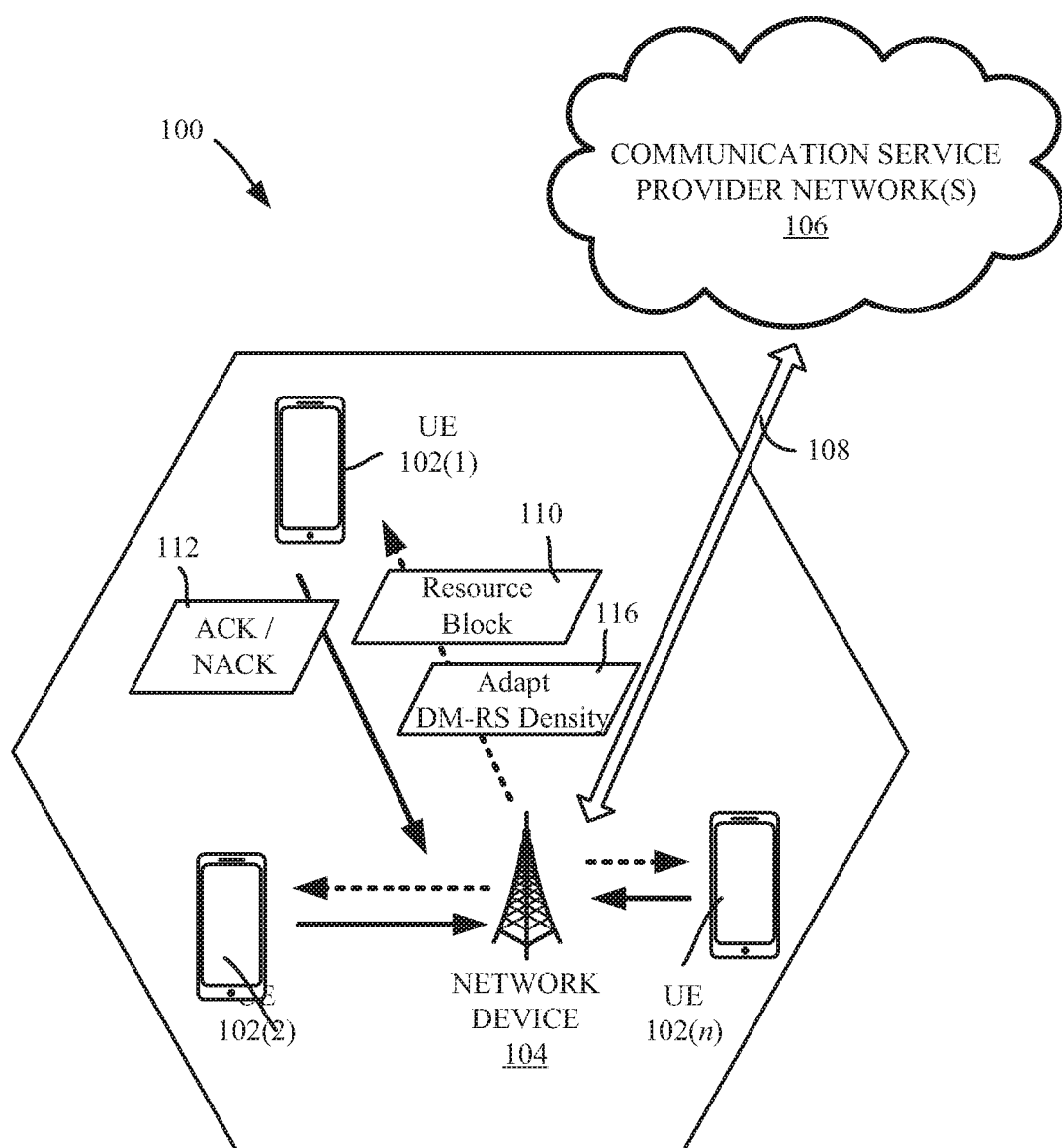
FIG. 1 illustrates an example wireless communication system in which a network device (e.g., network node) can use adaptive demodulation reference signals density with a user equipment (UE) to implement various aspects and implementations of the subject disclosure.

FIG. 1 illustrates an example wireless communication system 100 in accordance with various aspects and embodiments of the subject technology. In one or more embodiments, the system 100 can comprise one or more user equipment, e.g., UEs 102(1)-102(n).

In various embodiments, the system 100 is or comprises a wireless communication network serviced by one or more wireless communication network providers. In example embodiments, a UE 102 can be communicatively coupled to the wireless communication network via a network device 104 (e.g., network node). The network device 104 can communicate with the user equipment (UE), thus providing connectivity between the UE and the wider cellular network.

In example implementations, each UE such as the UE 102(1) is able to send and/or receive communication data via a wireless link to the network device 104. The dashed arrow lines from the network device 104 to the UE 102 represent downlink (DL) communications and the solid arrow lines from the UE 102 to the network device 104 represents uplink (UL) communications.

The system 100 can further include one or more communication service provider networks 106 that facilitate providing wireless communication services to various UEs, including UES 102(1)-102(n), via the network device 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.).

The network device 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

The wireless communication system 100 can employ various cellular systems, technologies, and modulation schemes to facilitate wireless radio communications between devices (e.g., a UE 102 and the network device 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc. For example, the system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system 100 can be configured to provide and employ 5G wireless networking features and functionalities. With 5G networks that may use waveforms that split the bandwidth into several sub-bands, different types of services can be accommodated in different sub-bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications; MIMO can be used for achieving diversity gain, spatial multiplexing gain and beamforming gain.

Note that using multi-antennas does not always mean that MIMO is being used. For example, a configuration can have two downlink antennas, and these two antennas can be used in various ways. In addition to using the antennas in a 2×2 MIMO scheme, the two antennas can also be used in a diversity configuration rather than MIMO configuration. Even with multiple antennas, a particular scheme might only use one of the antennas (e.g., LTE specification's transmission mode 1, which uses a single transmission antenna and a single receive antenna). Or, only one antenna can be used, with various different multiplexing, precoding methods etc.

The MIMO technique uses a commonly known notation (M×N) to represent MIMO configuration in terms number of transmit (M) and receive antennas (N) on one end of the transmission system. The common MIMO configurations used for various technologies are: (2×1), (1×2), (2×2), (4×2), (8×2) and (2×4), (4×4), (8×4). The configurations represented by (2×1) and (1×2) are special cases of MIMO known as transmit diversity (or spatial diversity) and receive diversity. In addition to transmit diversity (or spatial diversity) and receive diversity, other techniques such as spatial multiplexing (comprising both open-loop and closed-loop), beamforming, and codebook-based precoding can also be used to address issues such as efficiency, interference, and range.

Another concept is that of the rank of the transmission. In multiple antenna techniques, the incoming data can be split to be transmitted through multiple antennas, wherein each data stream processed and transmitted through an antenna is referred to as a transmission layer. The number of transmission layers is typically the number of transmit antennas. The data can be split into several parallel streams, where each stream contains different information. In another type, the incoming data is duplicated and each antenna transmits the same information. The term spatial layer refers to a data stream that includes information not included at the other layers. The rank of the transmission is equal to the number of spatial layers in an LTE spatial multiplexing transmission, that is, equals the number of different transmission layers transmitted in parallel. Even though the information in each layer may be manipulated in different ways by mathematical operations, when the operations do not change the information transmitted, a transmitter can be referred to as operating as a rank-1 transmitter. In a multi-antenna transmitter, different pieces of information are transmitted in parallel simultaneously in up to four different layers; a transmitter transmitting different information in parallel using four layers operates as a rank-4 transmitter.

In FIG. 1, as described herein, for data channel transmissions, a user equipment (e.g., 102(1)) receives resource blocks 110 comprising a grid of resource elements from the network device 104. Some resource elements comprise control information, other resource elements comprise demodulation reference signals and other resource elements comprise data. The user equipment 102(1) uses the demodulation reference signals to estimate the channel and demodulate the other resource elements of the resource block. If successful, that is, the channel estimation was correct and demodulation worked properly, the user equipment 102(1) returns an ACK, otherwise the user equipment 102(1) returns a NACK; this is represented in FIG. 1 via ACK/NACK responses 112.

As described herein, based on (one or more of) the ACK/NACK responses 112 corresponding to each resource block 110, the network device 104 can adapt the density of the demodulation reference signals in the next resource block. So that the user equipment 102(1) knows the density (and if not pre-defined, also knows the positions of the resource elements within the resource block that contain the demodulation reference signals, the density information 116 is sent to the user equipment 102(1) prior to or in conjunction with the next resource block. The density information 116 can, for example, be sent as control information on a control channel, such as in an explicitly reserved field or in unused bits of other field(s).

Figure 2:
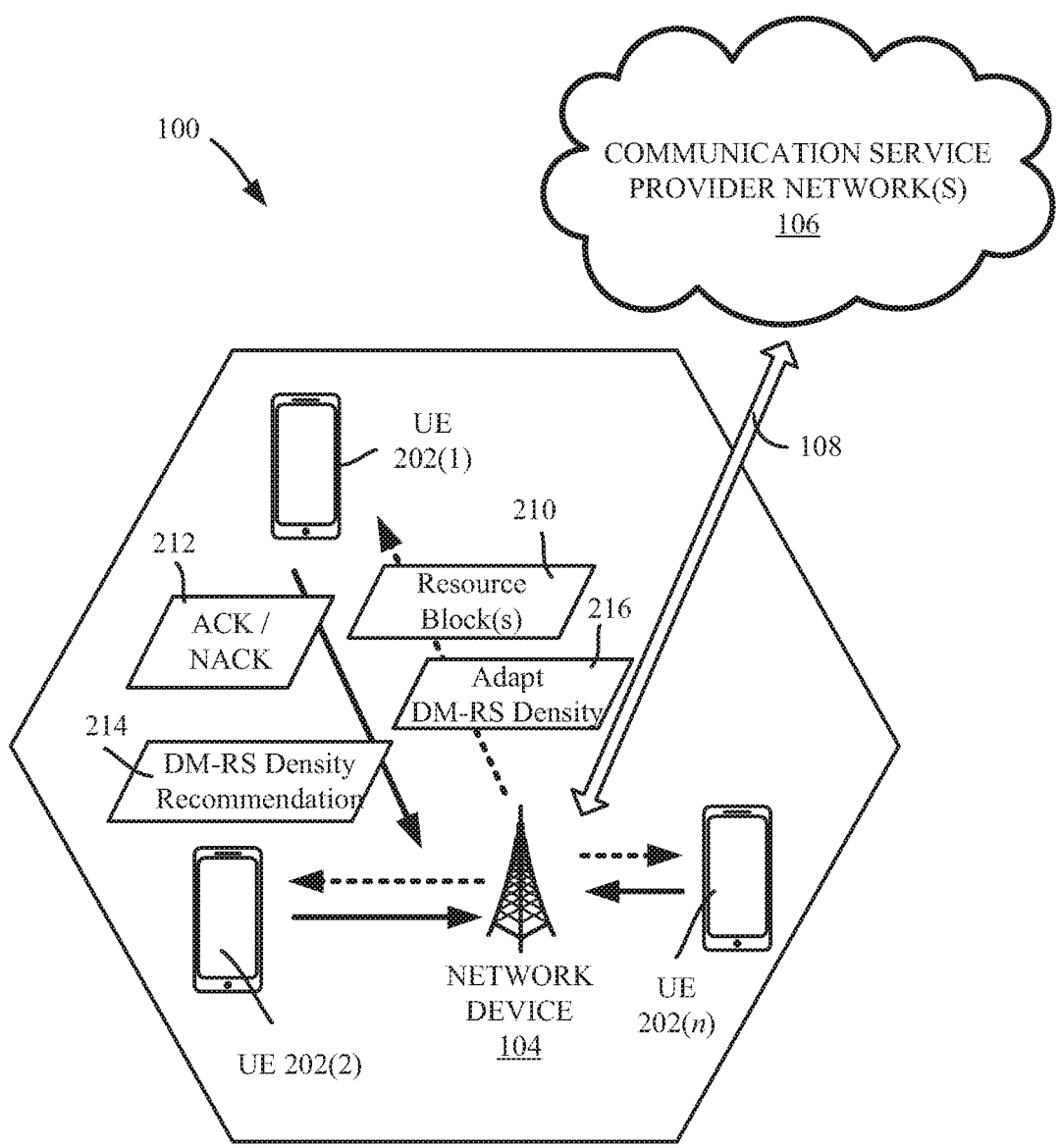
FIG. 2 illustrates an example wireless communication system in which a user equipment recommends an adaptive density change in demodulation reference signals density to a network node device to implement various aspects and implementations of the subject disclosure.

FIG. 2 is an alternative embodiment similar to FIG. 1, in which like elements are generally labeled 2xx instead of 1xx and are thus not described again in detail. However, in FIG. 2, the user equipment (e.g., 202(1)) is configured to determine and send a density recommendation 214 to the network device 104. This recommendation can be determined via ACK/NACKs, but can instead (or in addition to) be determined by other information, such as signal channel quality; for example, high SINR (signal-to-interference-plus-noise ratio) terminals that are close to the base station are likely to need a lesser demodulation reference signal density than low SINR terminals that are at the cell edge. Other factors, e.g., speed of the terminal, can be used in recommending a demodulation reference signal density change. Note that the network device can ignore the recommendation 214, or can accept the recommendation for a subsequent transmission.

It should be noted that FIGS. 1 and 2 are directed towards the concept of changing the demodulation reference signals density for downlink DM-RS transmissions. However, as is understood, the same principle can be applied for uplink transmissions, as well as side link transmissions, e.g., peer-to-peer, peer to local manager, and so forth.

Figure 3:
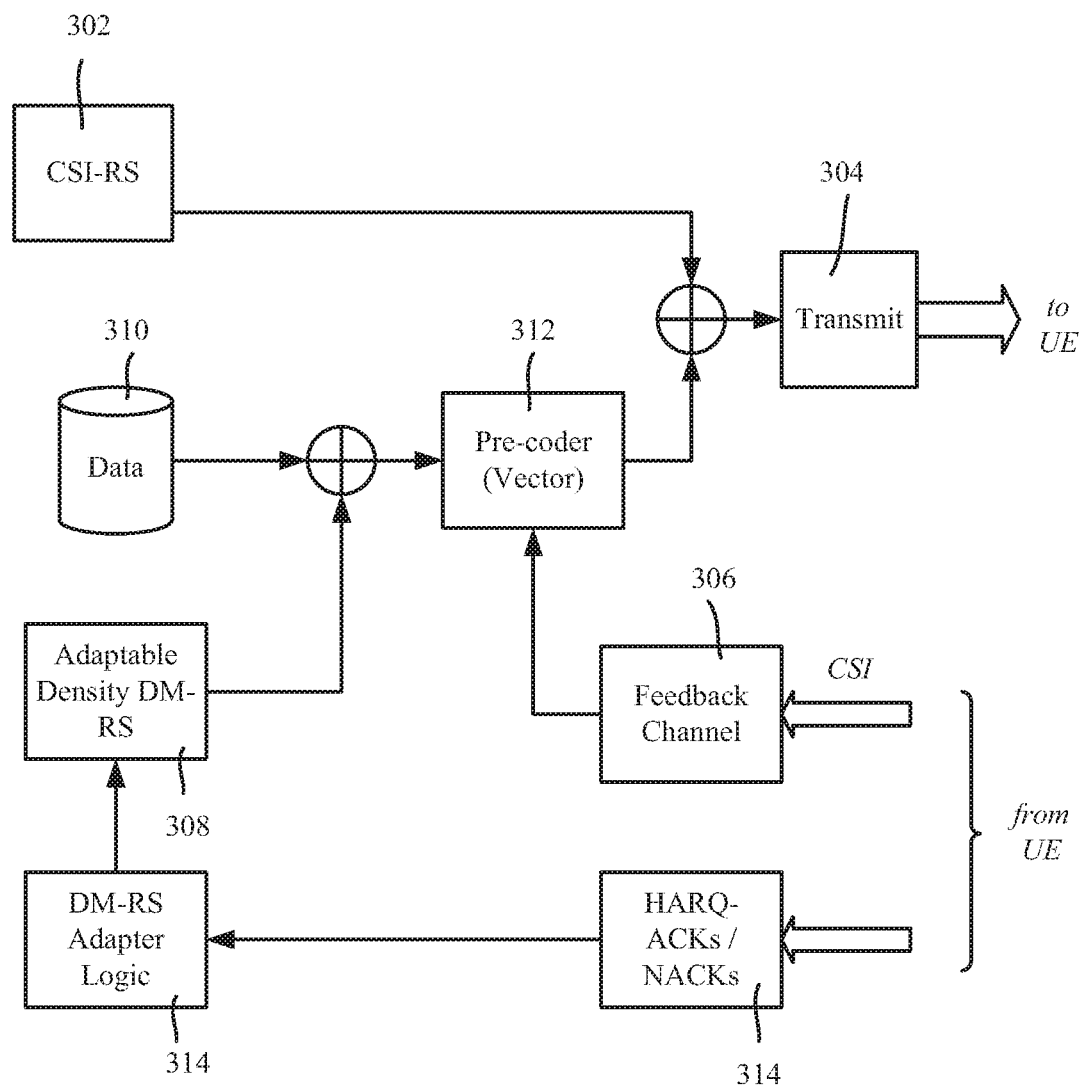
FIG. 3 is a conceptual block diagram of an example transmission portion of a multiple-input multiple-output (MIMO) New Radio system with adaptive demodulation reference signals, in accordance with various aspects and implementations of the subject disclosure.

FIG. 3 shows example transmission-related components of a New Radio multiple input, multiple output (MIMO) system that uses demodulation reference signals. At the transmitter, common channel state information reference signals (CSI-RS) 302 are transmitted (block 304) for channel sounding, whereby the user equipment (UE) receiver components (not explicitly shown) estimate the channel quality (typically SINR) from channel sounding, and computes the preferred precoding matrix (PMI), rank indicator (RI), and CQI for the next downlink transmission. The UE conveys this channel state information (CSI) back through a feedback channel 306.

Also shown in FIG. 3 is the (adaptable density) demodulation reference signals (DM-RS) 308, which are combined with data 310 in certain resource elements of the resource block and after pre-coding (block 312) transmitted to the user equipment. As described herein, based on information 314 returned from the user equipment, e.g., HARQ ACK/NACKs, demodulation reference signal adapter logic 314 can change the adaptable density of the demodulation reference signals (DM-RS) 308. Example demodulation reference signal adapter logic 308 is described herein with reference to FIGS. 7 and 9.

Note that although not shown in FIG. 3, information returned from the user equipment (e.g., via the feedback channel 306) can also include a recommendation to change the change the adaptable density of the demodulation reference signals 308, as described herein with reference to FIG. 2. Example user equipment recommendation logic is described herein with reference to FIGS. 8 and 10, with demodulation reference signal adapter logic 314 evaluating the recommendation as described herein with reference to FIG. 11 for possible action.

Figure 4:
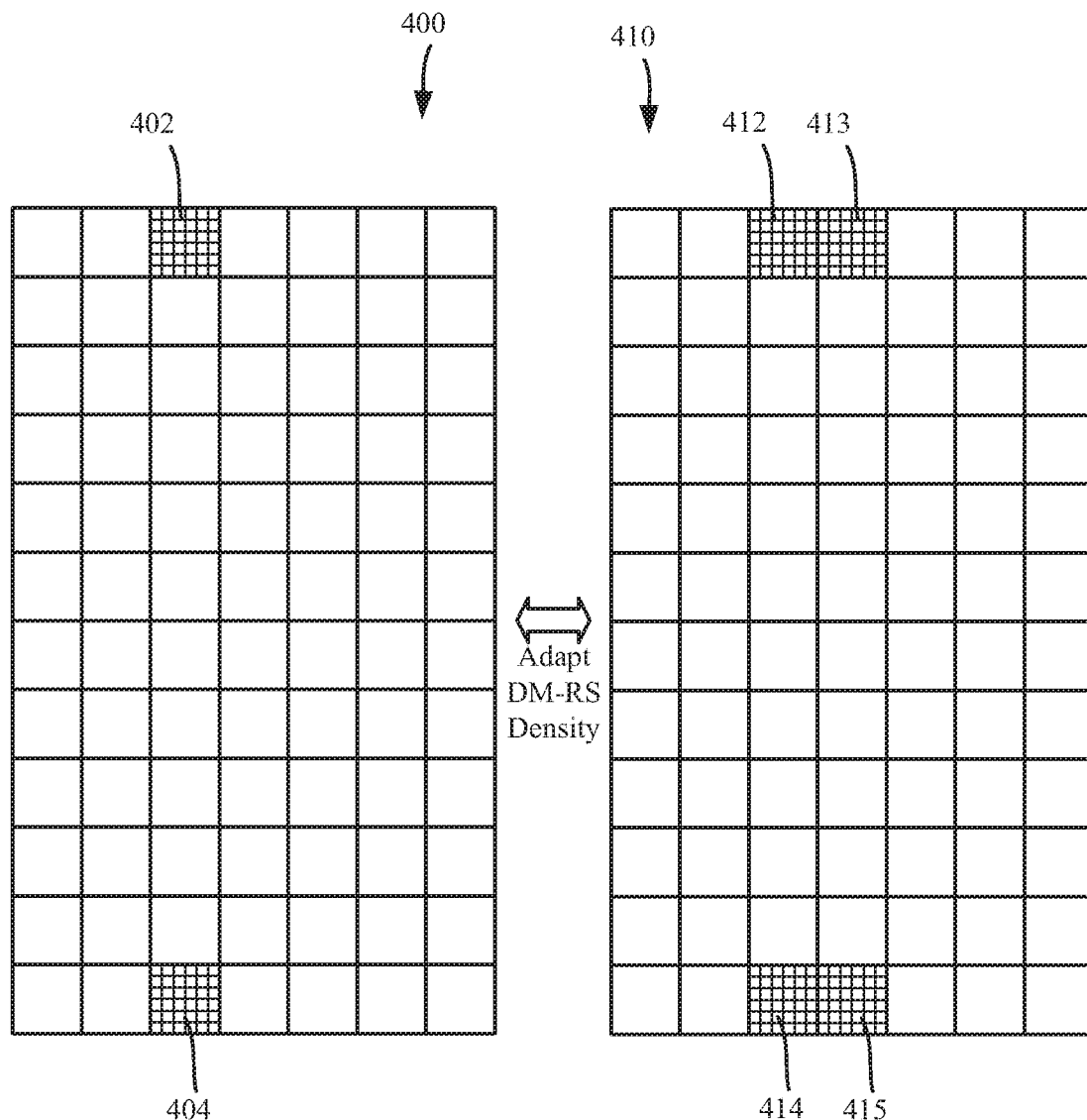
FIG. 4 is an example of adapting density of demodulation reference signals in time-frequency grid resource blocks based on communication-related information, in accordance with various aspects and implementations of the subject disclosure.

FIG. 4 shows a partial resource block 400 of twelve rows, seven columns, in which the demodulation reference signals are positioned in the time-frequency (X-Y) resource block orthogonal frequency-division multiplexing (OFDM) symbol grid at resource elements 402 and 404. In one or more implementations, a subsequent resource block 410 can have an increased demodulation reference signals density, e.g., shown via resource elements 412-415. As is understood, a later resource block (also represented in FIG. 4 by the resource block 400, but at a later time) can have a reduced demodulation reference signals density; that is, the density can be adaptively increased or decreased based on channel estimation performance, (e.g., increased based on one or more NACKs, decreased based on one or more ACKs relative to the channel estimation performance from previous transmission(s)).

One straightforward way to increase the density can be based on a single NACK; if a NACK is received, increase the density as in block 410 (if not already increased) in a next transmission. If an ACK is received, reduce the density as in block 400 (if not already decreased) in a next transmission, and so on. However as described herein, more than one ACK/NACK (not necessarily the same count) can be used before changing the density, or a trend of ACKs/NACKs over a period of time can be used to change the density.

Figure 5:
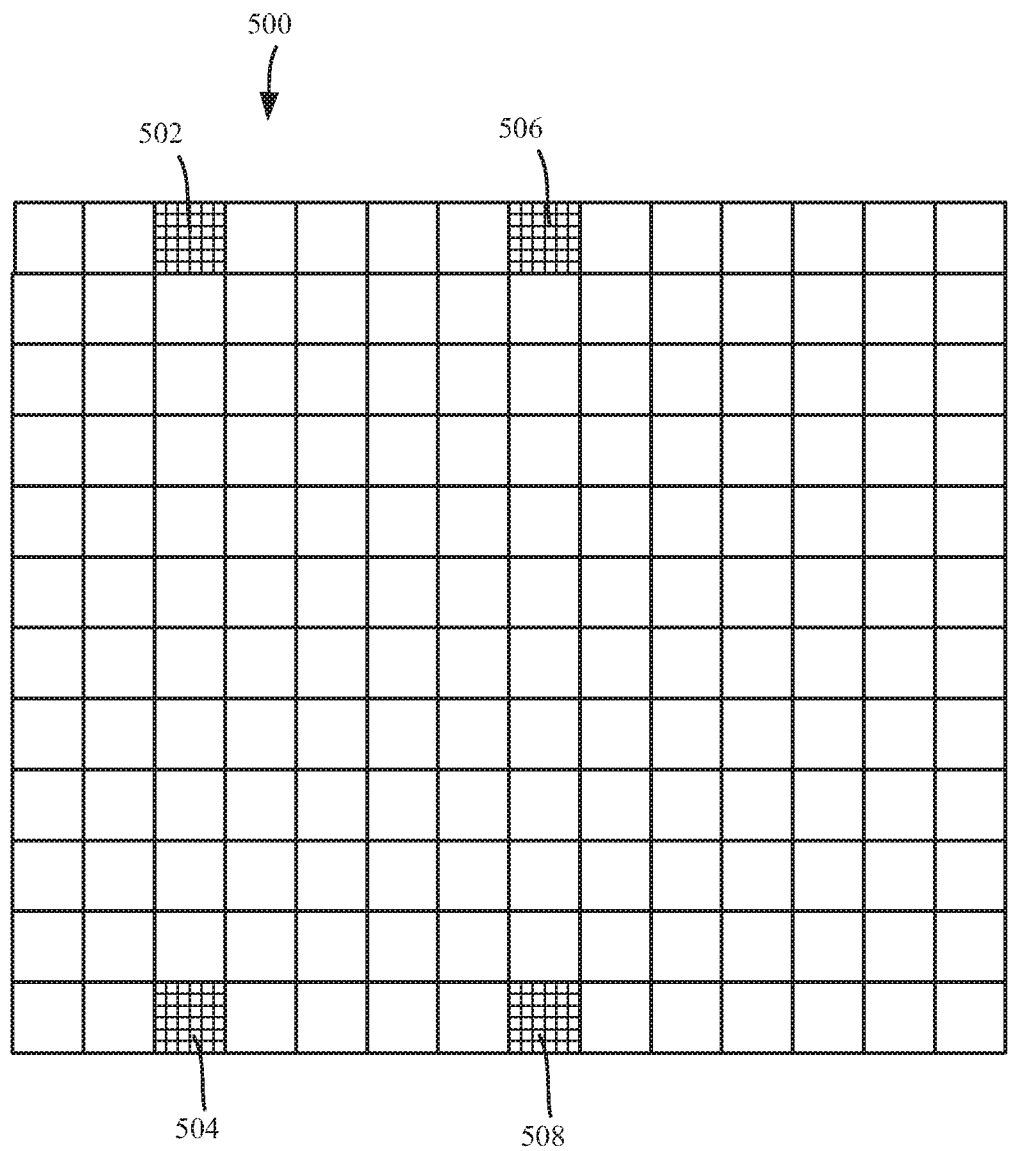
FIGS. 5 and 6 are further examples of adapting density of demodulation reference signals based on communication-related information, in accordance with various aspects and implementations of the subject disclosure.
Figure 6:
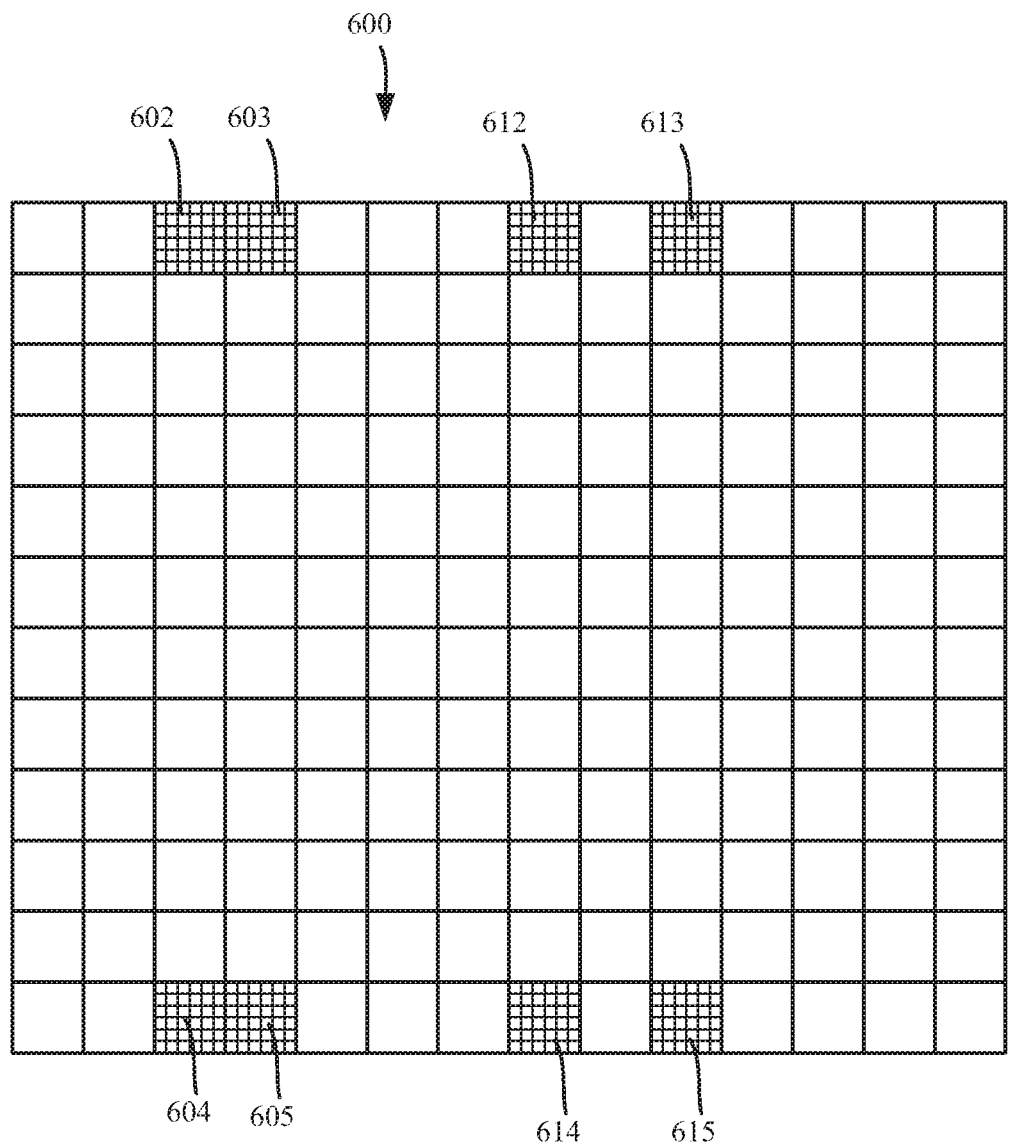

FIGS. 5 and 6 show resource blocks 500 and 600, respectively, of twelve rows, fourteen columns, in which the demodulation reference signals are positioned in the time-frequency (X-Y) resource block orthogonal frequency-division multiplexing (OFDM) symbol grid. FIG. 5, for example, has a reduced demodulation reference signals density, with resource elements 502, 504, 506 and 508 used for demodulation reference signals, relative to FIG. 6 which has resource elements 602-605 and 612-615 used for demodulation reference signals. Note that the examples of FIGS. 4 and 5 the demodulation reference signals in the resource elements are adjacent to each other in time, however, this is not a requirement, and they can be spread in time, as with resource elements 612 and 613, and 614 and 615, in FIG. 6.

Figure 7:
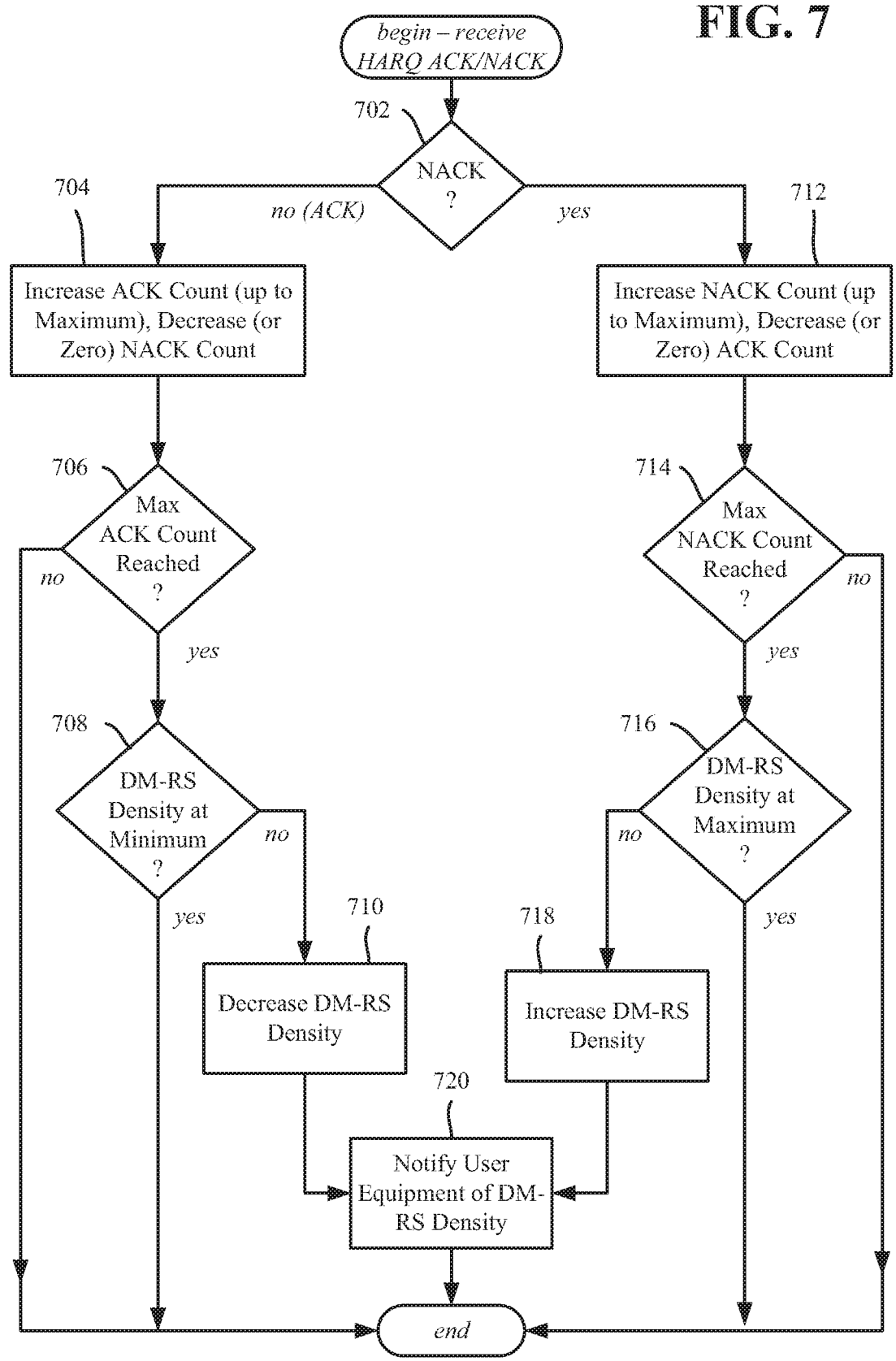
FIG. 7 illustrates a flow diagram of example network device operations that can be taken to adapt the density of demodulation reference signals based on user equipment feedback with respect to channel estimation performance, in accordance with various aspects and implementations of the subject disclosure.

Turning to example logic of determining whether to change the density, FIG. 7 shows example operations of a network node when a HARQ ACK/NACK is received. If, as evaluated at operation 702, the response was an ACK, in this example, operation 704 increases an ACK counter (up to some network-defined maximum) and decreases (or resets/zeros) a NACK counter.

At operation 706, if a maximum ACK count (which may be defined as one or any practical number) is reached, operation 708 evaluates whether the demodulation reference signal density is already at the minimum density; (if so, the densely cannot be lowered further). Note that more than one ACK, e.g., two or more consecutive ACKs can need to be counted before deciding whether the density can be reduced. If not at the minimum, operation 710 decreases the demodulation reference signal density, and operation 720 notifies the user equipment of the decreased demodulation reference signal density.

If instead a NACK is received as evaluated at operation 702, operation 712 increases the NACK counter, and decreases (or resets/zeros) the ACK counter. Operation 714 evaluates whether the maximum NACK count has been reached, and if so, operation 716 evaluates whether the demodulation referenced signal density can be increased. If the density can be increased, operation 718 increases the demodulation reference signal density, and operation 720 notifies the user equipment of the increased demodulation reference signal density. As can be seen, in this example logic the network can control how many consecutive (or even non-consecutive) ACKs and NACKs are needed before changing the demodulation reference signal density, within minimum and maximum density settings.

In this way, the technology described herein can transmit a demodulation reference signal density configuration based on a transmission number for a given HARQ-process, where the density is less for one transmission relative to a higher density for a subsequent transmission, or vice-versa. As can be readily appreciated, numerous ways to use counters, minimums and maximums or the like can be used to adaptively increase or decrease the demodulation reference signal density, and indeed, if a single ACK or single NACK changes the density, counters need not be used, and minimums and maximums can be inherent (track the last ACK or NACK and change or do not change the density).

Figure 8:
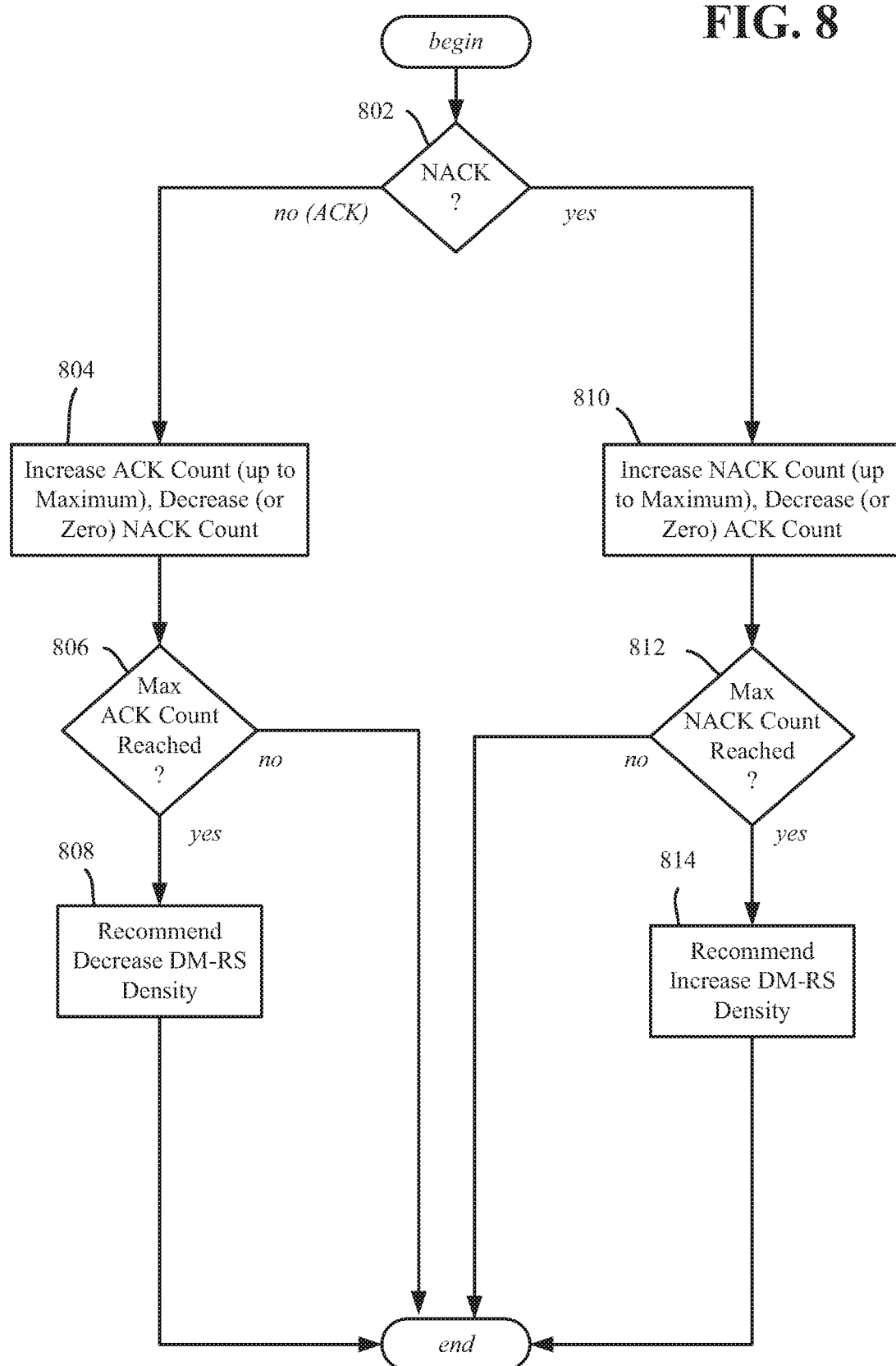
FIG. 8 illustrates a flow diagram of example user equipment operations that can be taken to recommend a change in demodulation reference signals density based on channel estimation performance, in accordance with various aspects and implementations of the subject disclosure.

FIG. 8 shows example logic, e.g., performed by user equipment, for determining whether to recommend a change in the demodulation reference signal density. Operation 802 evaluates whether the response to be sent from the user equipment with respect to a data channel transmission is a HARQ-ACK or NACK. If an ACK, operation 804 increases the ACK counter (up to some maximum) and decreases (or resets/zeroes) the NACK counter. If a maximum ACK count (which may be as low as one) is reached as evaluated by operation 806, operation 808 recommends a decrease in the demodulation reference signal density. Note that the density may already be at a minimum, in which case the network node can ignore the recommendation; alternatively, the user equipment can track whether the density is already at a minimum to avoid the extra recommendation-related operations.

If instead operation 802 determines the response will be a HARQ-NACK, operation 810 increases the NACK counter (up to some maximum) and decreases (or zeroes) the ACK counter. If a maximum NACK count (which may be as low as one) is reached as evaluated by operation 812, operation 814 recommends an increase in the demodulation reference signal density. Note that the density may already be at a maximum, in which case the network node can ignore the recommendation; alternatively, the user equipment can track whether the density is already at a maximum to avoid the extra recommendation transmission. Note that in any event, the network device can choose to ignore the recommendation, or use it as one factor (among one or more others) in making a determination as to a density change.

Figure 9:
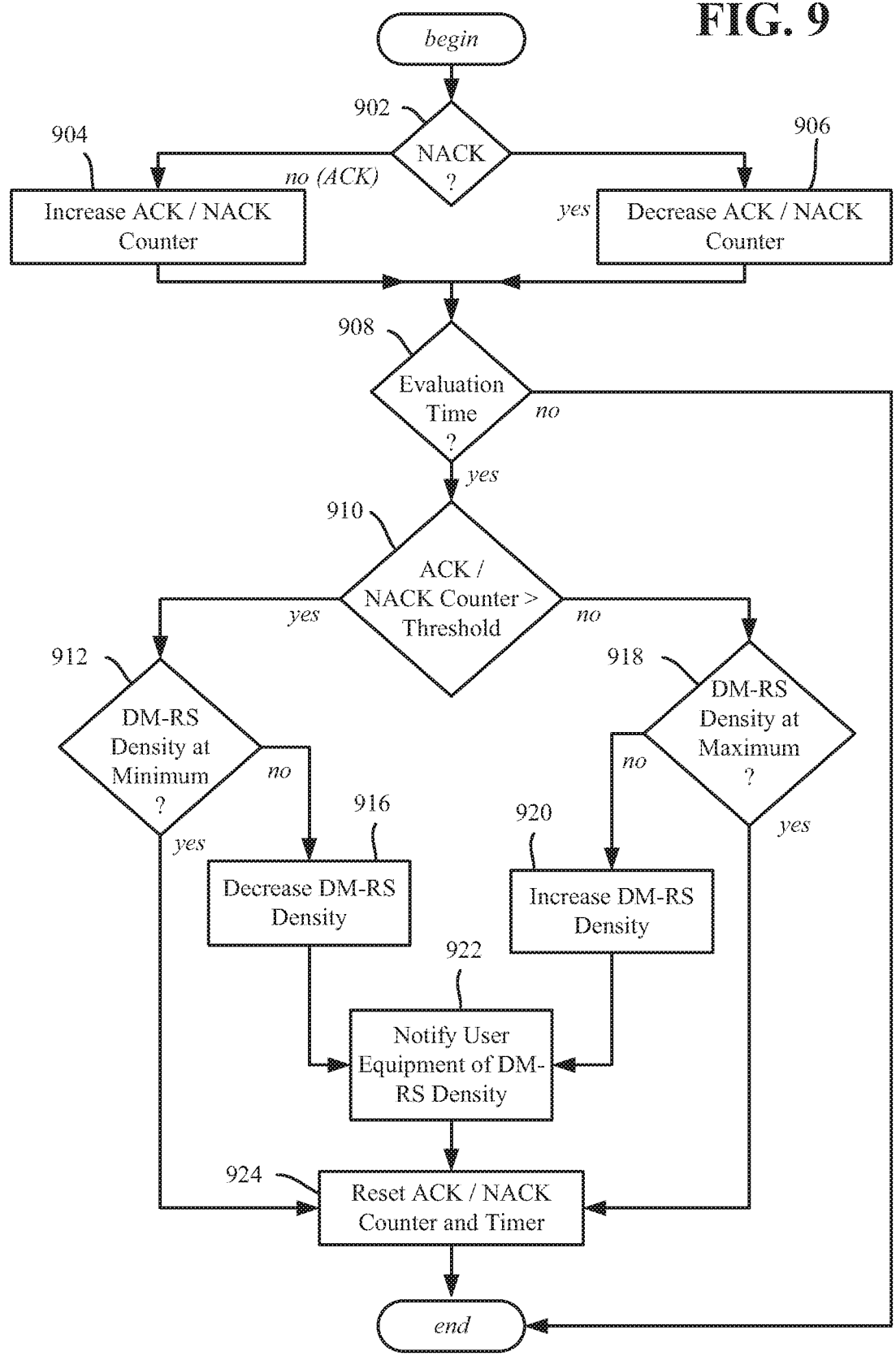
FIG. 9 illustrates a flow diagram of example network device operations that can be taken to adapt the density of demodulation reference signals based on user equipment feedback with respect to channel estimation performance over a period of time, in accordance with various aspects and implementations of the subject disclosure.

FIG. 9 shows alternative example logic, e.g., performed by the network device, for determining whether to change in the demodulation reference signal density; as will be understood, in general, the logic of FIG. 9 operates to change the demodulation reference signal density based on the HARQ statistics received over period of time for a particular user equipment.

Operation 902 evaluates whether the response from the user equipment with respect to a data channel transmission is a HARQ-ACK or NACK. If an ACK, operation 904 increases an ACK/NACK counter (possibly up to some maximum). If a NACK, operation 906 decreases the ACK/NACK counter, which can go negative).

Note that in this example there is one counter, e.g., that operates by adding one for an ACK and subtracting one for a NACK; however the increase amount need not be the same as the decrease amount, e.g., add one for a NACK and subtract two for a NACK. In one or more alternative implementations, there can be two counters and a ratio or (possibly weighted) difference may be used to evaluate whether a demodulation reference signaled density increase or decrease is desirable.

Operation 908 represents determining whether the evaluation period of time is reached. If not, statistics continue to be accumulated based on further ACK/NACK responses from the user equipment.

If the time to evaluate the statistics is reached, operation 910 evaluates the HARQ-ACK/NACK counter against with respect to some threshold value determined by the network. In this example, only one threshold value is used, such as zero, however note that more than one threshold value can be used e.g., a positive threshold value and a negative threshold value, e.g., change, within density limit, if positive count is greater than three, or negative count is below minus two.

If at operation 910 the threshold is exceeded, in this example operation 912 evaluates whether the density is already at a minimum density. If so, operation 924 resets the ACK/NACK counter and the timer to collect new statistics over another period of time. Otherwise, operation 916 decreases the demodulation reference signal density, operation 922 notifies the user equipment of the reduced density, and operation 924 resets the ACK/NACK counter.

If at operation 910 the threshold is not exceeded, in this example operation 918 evaluates whether the density is already at a maximum density. If so, operation 924 resets the ACK/NACK counter to collect new statistics over another period of time. Otherwise, operation 920 increases the demodulation reference signal density, operation 922 notifies the user equipment of the reduced density, and operation 924 resets the ACK/NACK counter and the timer.

Figure 10:
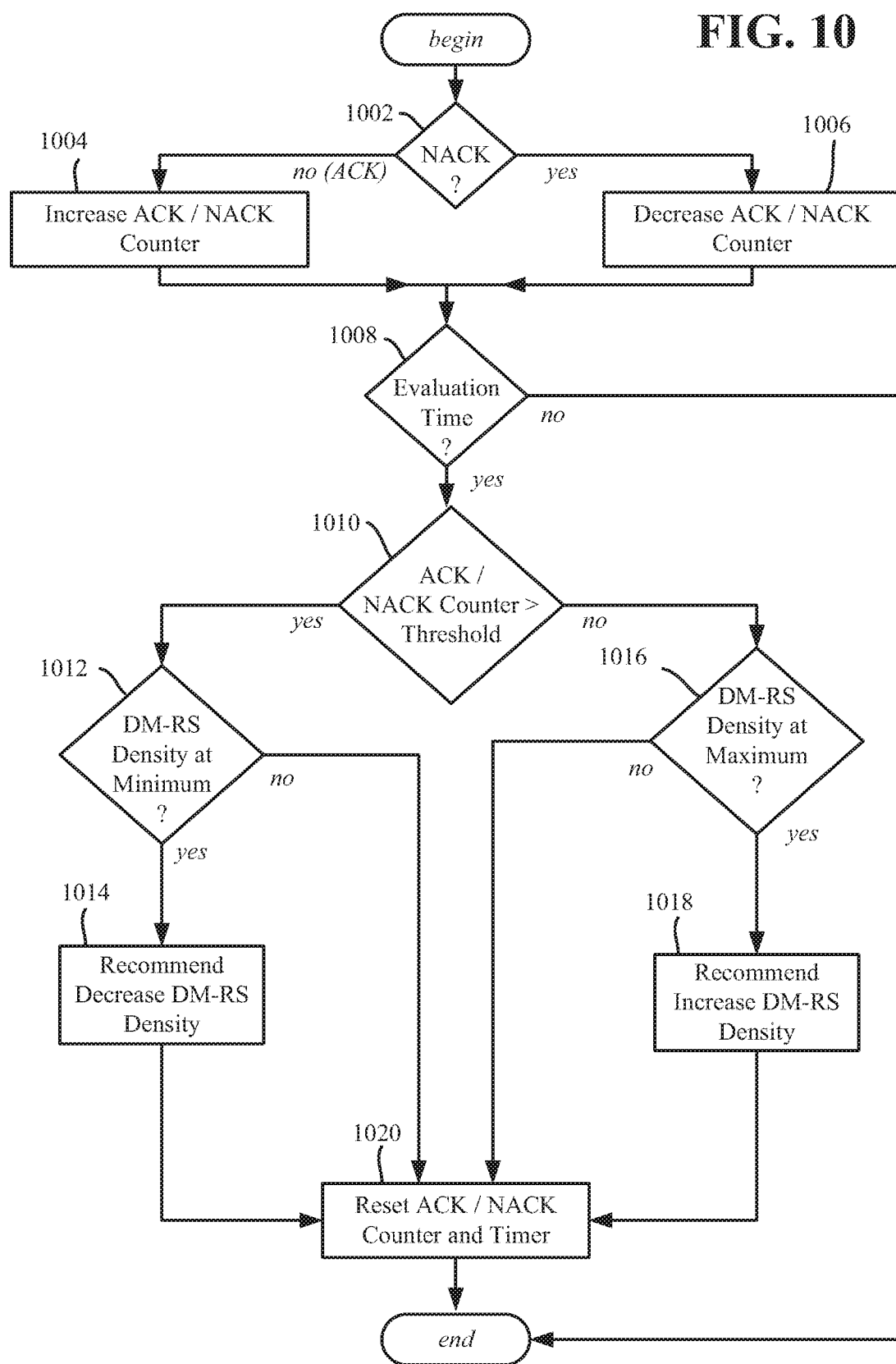
FIG. 10 illustrates a flow diagram of example user equipment operations that can be taken to recommend a change in demodulation reference signals density based on channel estimation performance over a period of time, in accordance with various aspects and implementations of the subject disclosure.

FIG. 10 shows alternative example logic, e.g., performed by a user equipment, for determining whether to recommend a change in the demodulation reference signal density; as will be understood, in general, the logic of FIG. 10 operates to change the demodulation reference signal density based on the HARQ statistics sent (and to be sent) over period of time for a particular user equipment.

Operation 1002 evaluates whether the response to be sent from the user equipment with respect to a received data channel transmission and demodulation is a HARQ-ACK or NACK. If an ACK, operation 1004 increases an ACK/NACK counter (possibly up to some maximum). If a NACK, operation 1006 decreases the ACK/NACK counter, which in this example can go negative).

Note that in this example (as in FIG. 9) there is one counter, e.g., that operates by adding one for an ACK and subtracting one for a NACK; however as before the increase amount need not be the same as the decrease amount, e.g., add one for a NACK and subtract two for a NACK. In one or more alternative implementations, there can be two counters and a ratio or (possibly weighted) difference may be used to evaluate whether a demodulation reference signaled density increase or decrease is desirable.

Operation 1008 represents determining whether the evaluation period of time is reached. If not, statistics continue to be accumulated based on further ACK/NACK responses to be sent from the user equipment.

If the time to evaluate the statistics is reached, operation 1010 evaluates the HARQ-ACK/NACK counter against with respect to some threshold value, configured in the user equipment by the network. In this example, only one threshold value is used, such as zero, however note that more than one threshold value can be used e.g., a positive threshold value and a negative threshold value, e.g., change, within density limit, if positive count is greater than three, or negative count is below minus two.

If at operation 1010 the threshold is exceeded, in this example operation 1012 evaluates whether the density is already at a minimum density. If so, operation 1024 resets the ACK/NACK counter and timer to collect statistics for another period of time. Otherwise, operation 1014 recommends a decrease in the demodulation reference signal density, and operation 1020 resets the ACK/NACK counter and timer.

If at operation 1010 the threshold is not exceeded, in this example the operation 1016 evaluates whether the density is already at a maximum density. If so, operation 1020 resets the ACK/NACK counter and timer to collect new statistics over another period of time. Otherwise, operation 1018 recommends an increase in the demodulation reference signal density, and operation 1020 resets the ACK/NACK counter and timer.

Figure 11:
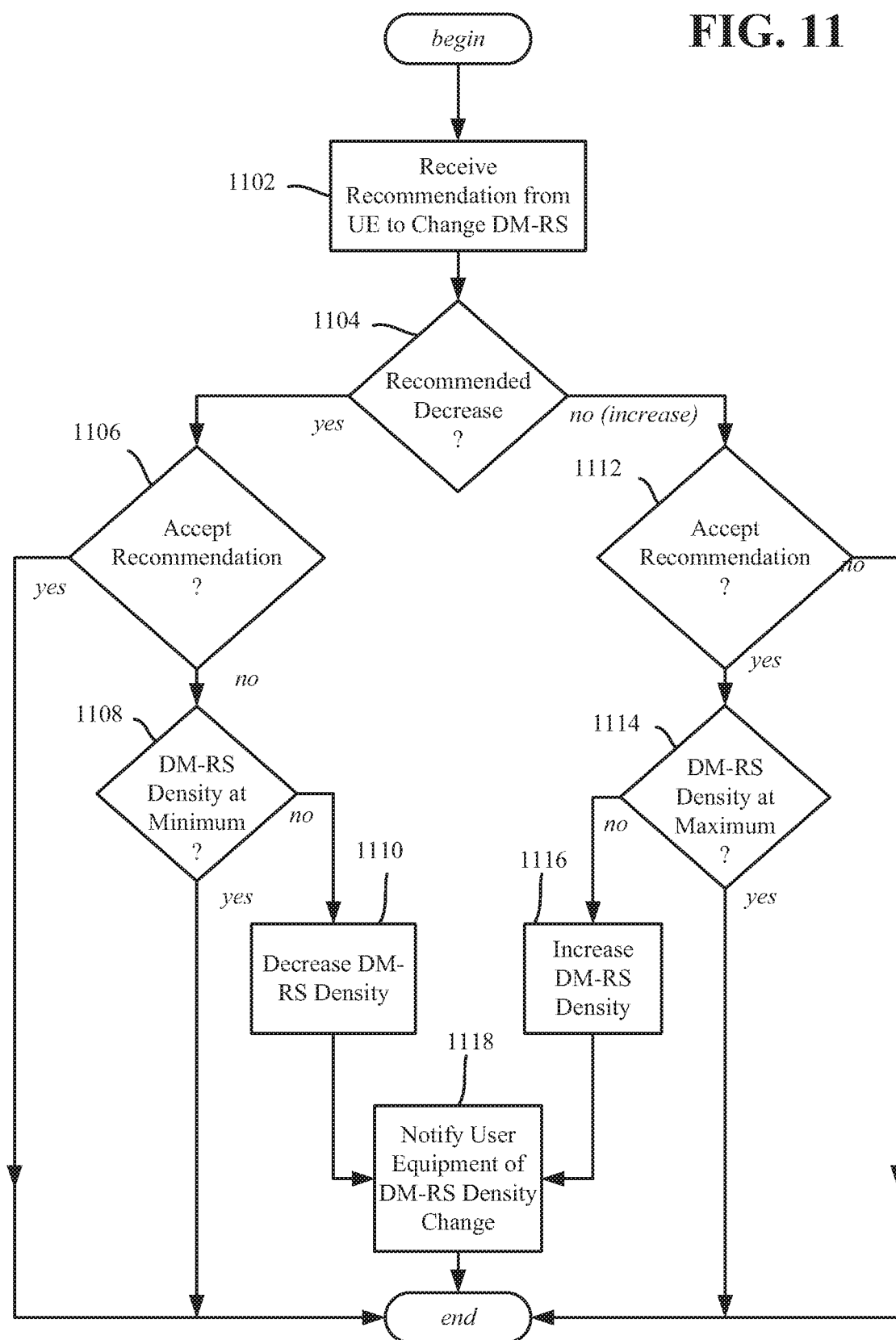
FIG. 11 illustrates a flow diagram of example network device operations that can be taken to accept or reject a user equipment's recommendation to adapt the density of demodulation reference signals, in accordance with various aspects and implementations of the subject disclosure.

FIG. 11 shows example operations of a network device when a recommendation to change the density is received from the user equipment (operation 1102). Operation 1104 evaluates whether a decrease was recommended, versus an increase. If a decrease, operation 1106 determines whether or not to accept the recommendation based on whatever factors the network device chooses. For example, the network device may have very little data to send to the user equipment, whereby a decrease in density at this time can be ignored or deferred. If the recommendation is accepted, operation 1108 represents evaluating whether the demodulation reference signal density is already at the minimum. If not, operation 1110 decreases the density, and operation 1118 notifies the user equipment of the density change. Note that operation 1106 can be combined with operation 1108, e.g., if the density is already at a minimum, then that can be a factor that outweighs any other factors.

If at operation 1104 a recommended increase is recognized, operation 1112 determines whether the recommendation is to be accepted, using whenever factors the network device chooses to use for an increase. If accepted, operation 1114 represents evaluating whether the demodulation reference signal density is already at the maximum. If not, operation 1118 increases the density, and operation 1118 notifies the user equipment of the density change. Note that operation 1112 can be combined with operation 1114, e.g., if the density is already at a maximum, then that can be a factor that outweighs any other factors.

Figure 12:
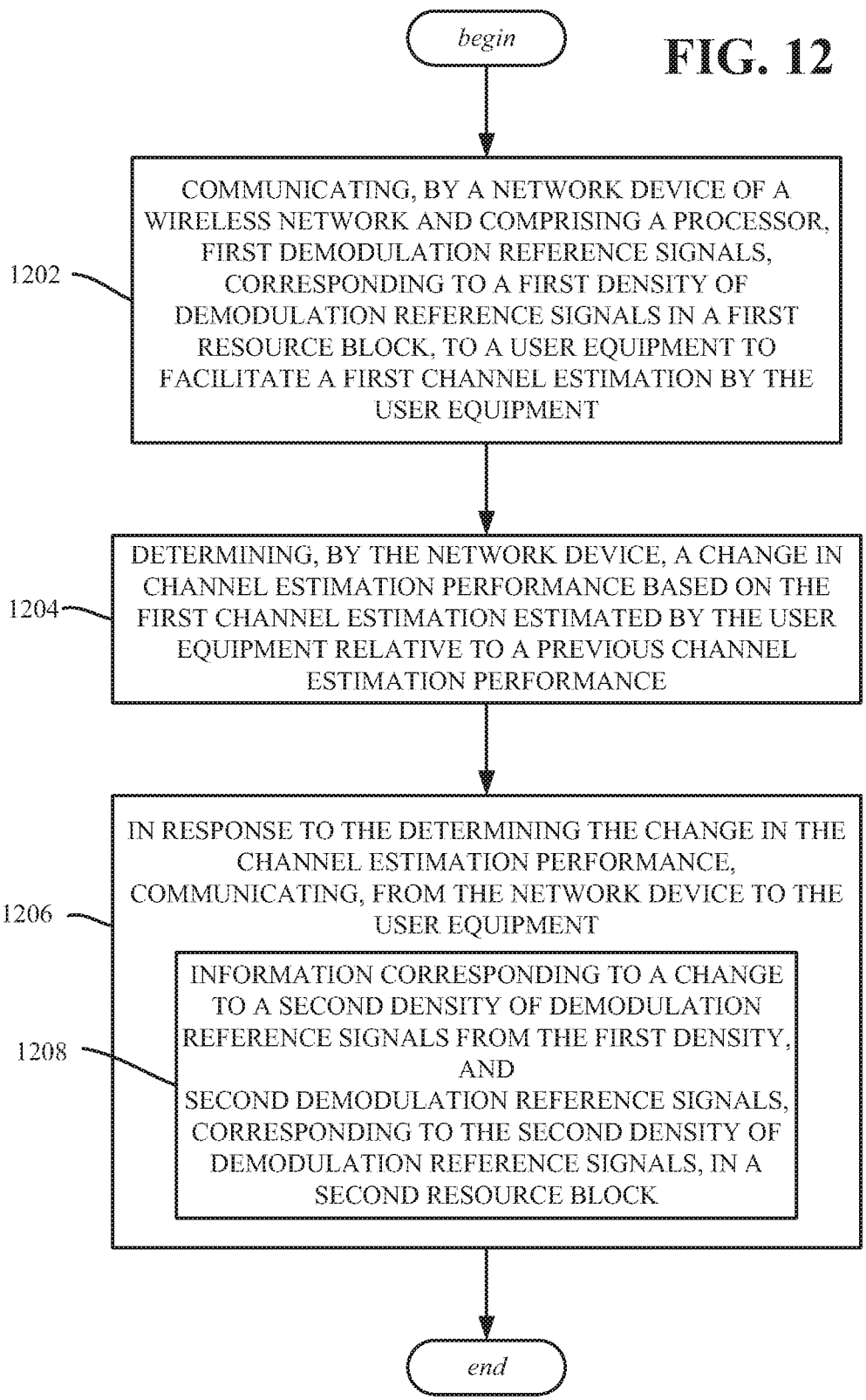
FIG. 12 illustrates a flow diagram of example aspects of operations, e.g., of a network device, in accordance with various aspects and implementations of the subject disclosure.

FIG. 12 summarizes various example operations of a network device, including operation 1202 which represents communicating, by a network device of a wireless network and comprising a processor, first demodulation reference signals, corresponding to a first density of demodulation reference signals in a first resource block, to a user equipment to facilitate a first channel estimation by the user equipment. Operation 1204 represents determining, by the network device, a change in channel estimation performance based on the first channel estimation estimated by the user equipment relative to a previous channel estimation performance. In response to the determining the change in the channel estimation performance, Operation 1206 represents communicating, from the network device to the user equipment, (operation 1208) information corresponding to a change to a second density of demodulation reference signals from the first density, and second demodulation reference signals, corresponding to the second density of demodulation reference signals, in a second resource block.

The first demodulation reference signals can comprise downlink demodulation reference signals, and communicating the information corresponding to the change to the second density of demodulation reference signals from the network device to the user equipment can comprise transmitting the information via a downlink control channel.

Determining the change in the channel estimation performance of the channel estimation can comprise determining a reduced performance of the first channel estimation relative to the previous channel estimation performance; communicating the information corresponding to the change to the second density of demodulation reference signals can comprise communicating information corresponding to an increase from the first density of demodulation reference signals to the second density of demodulation reference signals, and communicating the second demodulation reference signals in the second resource block can comprise communicating the second resource block with an increased density of demodulation reference signals, the increased density corresponding to the second density. Determining the change in the channel estimation performance of the channel estimation can comprise determining the reduced performance of the channel estimation relative to the previous channel estimation performance based on a hybrid automatic repeat request negative acknowledgment transmission number for a hybrid automatic repeat request process. Determining the change in the channel estimation performance of the channel estimation can comprise determining the reduced performance of the channel estimation based on a hybrid automatic repeat request statistics determined over a period of time for the user equipment.

Determining the change in the channel estimation performance of the channel estimation can comprise determining an increased performance of the first channel estimation relative to the previous channel estimation performance, wherein the communicating the information corresponding to the change to the second density of demodulation reference signals can comprise communicating information corresponding to an decrease from the first density of demodulation reference signals to the second density of demodulation reference signals, and wherein the communicating the second demodulation reference signals in the second resource block can comprise communicating the second resource block with an decreased density of demodulation reference signals, the decreased density corresponding to the second density. Determining the change in the channel estimation performance of the channel estimation can comprise determining the increased performance of the channel estimation relative to the previous channel estimation performance based on a hybrid automatic repeat request acknowledgment transmission number for a hybrid automatic repeat request process. Determining the change in the channel estimation performance of the channel estimation can comprise determining the increased performance of the channel estimation based on a hybrid automatic repeat request statistics determined over a period of time for the user equipment.

Determining the change in the channel estimation performance of the channel estimation can comprise receiving a recommendation indication from the user equipment.

Figure 13:
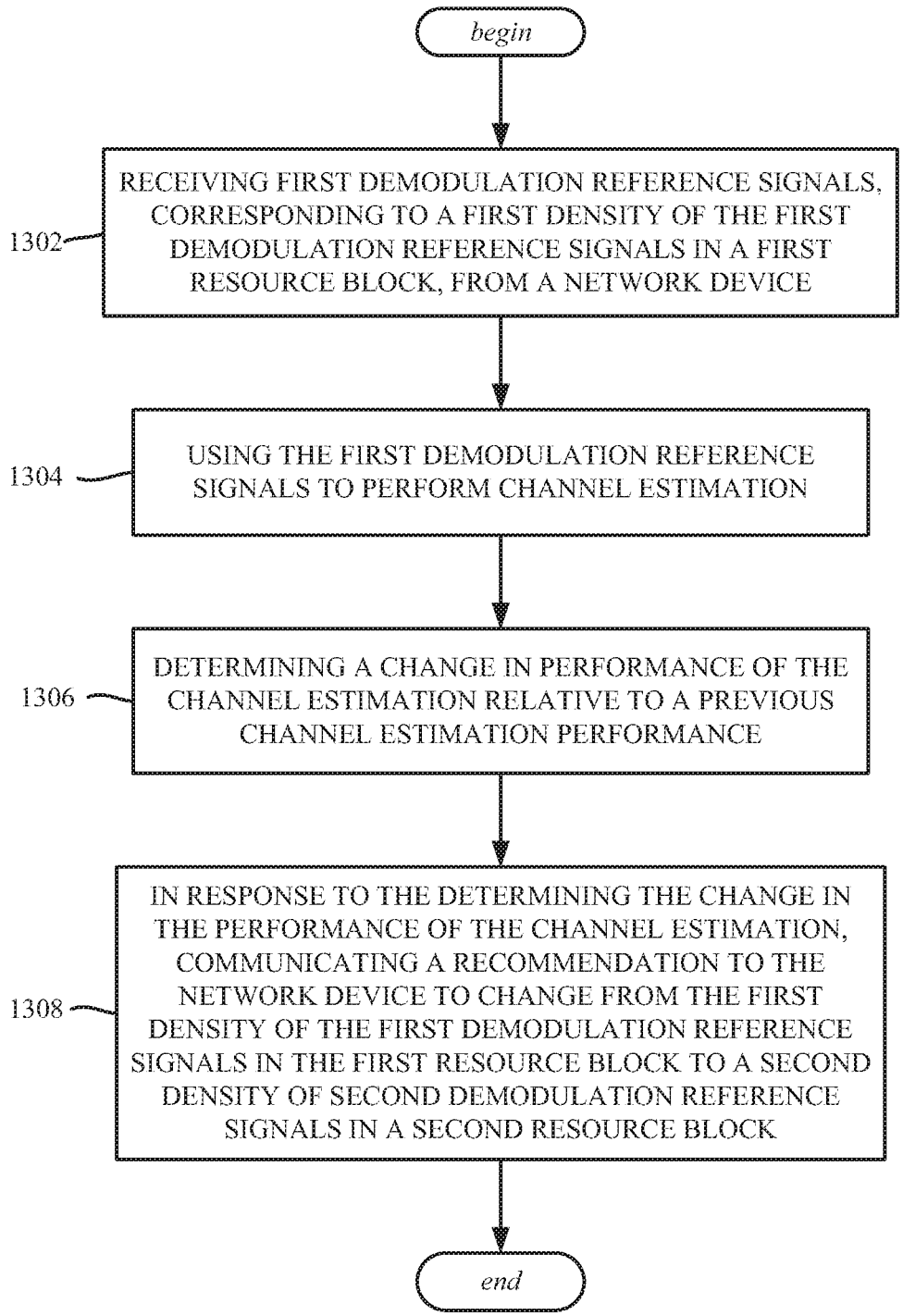
FIG. 13 illustrates a flow diagram of example aspects of operations, e.g., of a user equipment, in accordance with various aspects and implementations of the subject disclosure.

FIG. 13 summarizes various example operations of a user equipment device, e.g., comprising a processor and a memory that stores executable instructions that, when executed by the processor, facilitate performance of operations. Operation 1302 represents receiving first demodulation reference signals, corresponding to a first density of the first demodulation reference signals in a first resource block, from a network device. Operation 1304 represents using the first demodulation reference signals to perform channel estimation. Operation 1306 represents determining a change in performance of the channel estimation relative to a previous channel estimation performance. Operation 1308 represents in response to the determining the change in the performance of the channel estimation, communicating a recommendation to the network device to change from the first density of the first demodulation reference signals in the first resource block to a second density of second demodulation reference signals in a second resource block.

Aspects can comprise receiving information corresponding to a change to the second density of the second demodulation reference signals from the network device, receiving the second demodulation reference signals, corresponding to the second density, in the second resource block, and performing the channel estimation based on the second demodulation reference signals.

Determining the change in the performance of the channel estimation can comprise determining a reduced performance of the channel estimation relative to the previous channel estimation, and communicating the recommendation to the network device to change from the first density of the first demodulation reference signals in the first resource block to the second density of the second demodulation reference signals in the second resource block can comprise recommending an increased density of the second demodulation reference signals in the second resource block.

Determining the change in the performance of the channel estimation can comprise determining an increased performance of the channel estimation relative to the previous channel estimation, and wherein the communicating the recommendation to the network device to change from the first density of the first demodulation reference signals in the first resource block to the second density of the second demodulation reference signals in the second resource block can comprise recommending a decreased density of the second demodulation reference signals in the second resource block.

Determining the change in the performance of the channel estimation by the user equipment device can comprise determining the change in the performance based on at least one of a hybrid automatic repeat request acknowledgment or a hybrid automatic repeat request negative acknowledgment. Determining the change in the performance of the channel estimation by the user equipment device can comprise determining the change in the performance based on a hybrid automatic repeat request statistic corresponding to a period of time.

Figure 14:
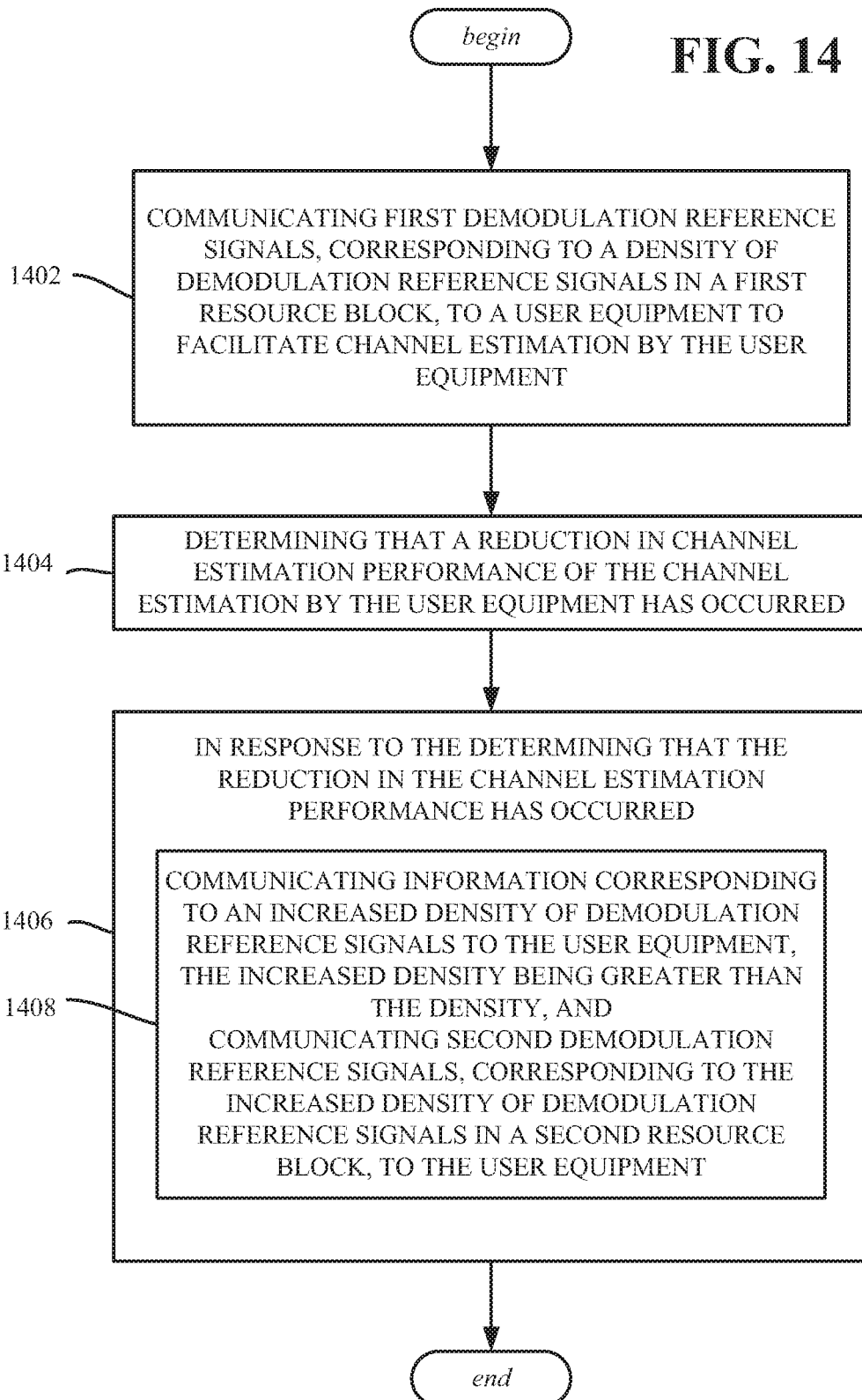
FIG. 14 illustrates a flow diagram of example aspects of operations, e.g., of a network device, in accordance with various aspects and implementations of the subject disclosure.

FIG. 14 summarizes various example operations of a network device, e.g., comprising executable instructions of a machine-readable storage medium, in which the executable instructions, when executed by a processor of the network device of network devices of a wireless network, facilitate performance of the example operations. Operation 1402 represents communicating first demodulation reference signals, corresponding to a density of demodulation reference signals in a first resource block, to a user equipment to facilitate channel estimation by the user equipment. Operation 1404 represents determining that a reduction in channel estimation performance of the channel estimation by the user equipment has occurred. Operation 1406 represents, in response to the determining that the reduction in the channel estimation performance has occurred, (operation 1408) communicating information corresponding to an increased density of demodulation reference signals to the user equipment, the increased density being greater than the density, and communicating second demodulation reference signals, corresponding to the increased density of demodulation reference signals in a second resource block, to the user equipment.

Determining that the reduction in the channel estimation performance has occurred can comprise determining that the reduction in the channel estimation performance has occurred based on a hybrid automatic repeat request negative acknowledgment transmission number for a hybrid automatic repeat request process. Determining that the reduction in the channel estimation performance has occurred can comprise determining that the reduction in the channel estimation performance has occurred based on historical hybrid automatic repeat request measurements determined over a period of time for the user equipment. Determining that the reduction in the channel estimation performance has occurred can comprise receiving a recommendation indication, corresponding to a request to further increase the increased density of the demodulation reference signals in the second resource block, from the user equipment.

The information can be first information, and the operations can further comprise, determining an increase in channel estimation performance by the user equipment, and in response to the determining the increase, communicating second information corresponding to a decreased density of demodulation reference signals to the user equipment, the decreased density being less than the increased density, and communicating third demodulation reference signals, corresponding to the decreased density of demodulation reference signals, in a third resource block to the user equipment.

As can be seen, there is described adaptable demodulation reference signals density based on channel estimation performance, e.g., based on the transmission number or based on the HARQ-ACK/NCAK received in the previous transmission(s). The technology described herein takes advantage of the property that allocating more resources for the reference signal provides a small channel estimation error when needed for better channel estimation performance, but uses less resources for the reference signal when not needed for better channel estimation performance, thereby more efficiently using those resources for data.

Figure 15:
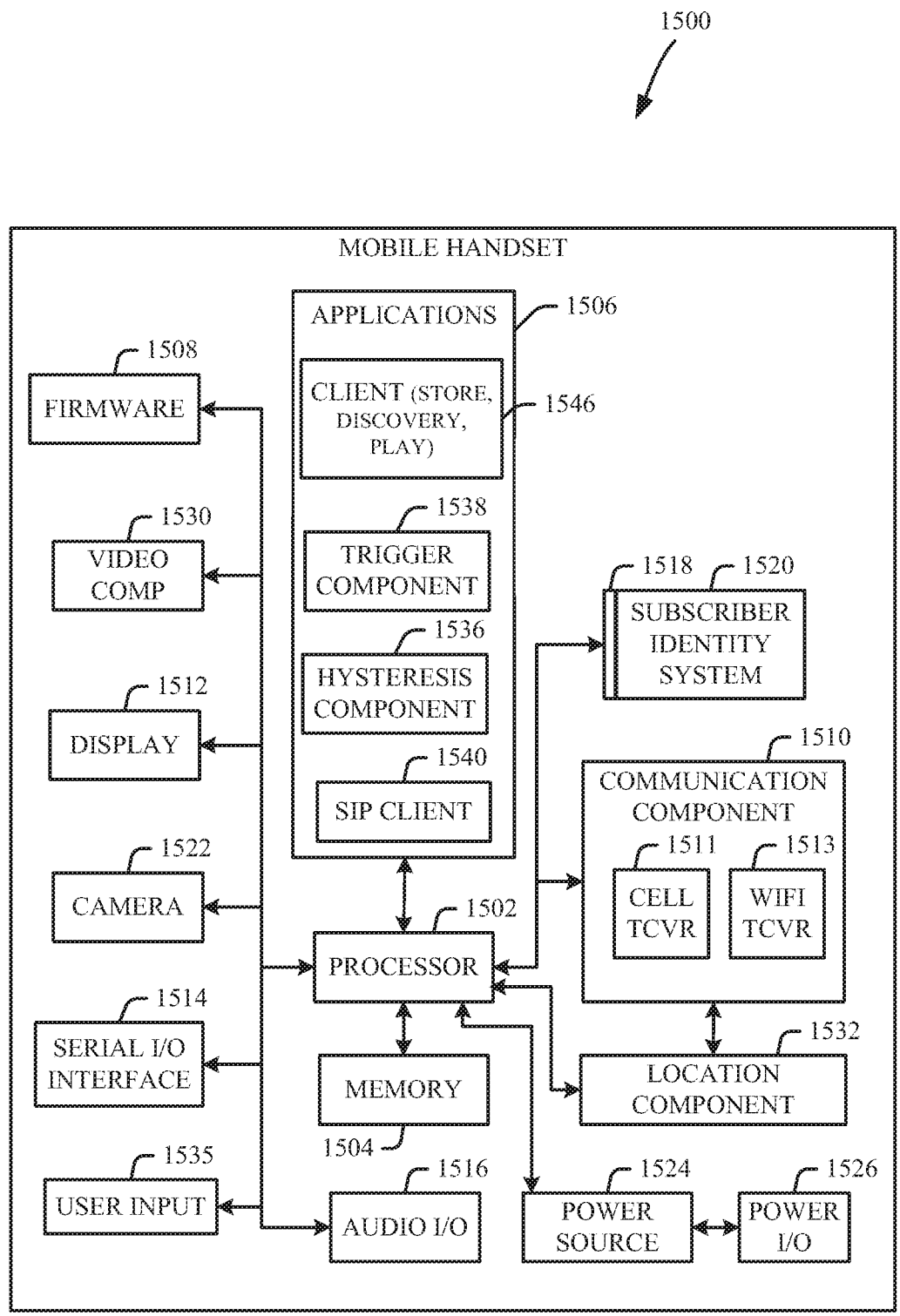
FIG. 15 illustrates an example block diagram of an example mobile handset operable to engage in a system architecture that facilitates wireless communications according to one or more embodiments described herein.

Referring now to FIG. 15, illustrated is an example block diagram of an example mobile handset 1500 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media The handset includes a processor 1502 for controlling and processing all onboard operations and functions. A memory 1504 interfaces to the processor 1502 for storage of data and one or more applications 1506 (e.g., a video player software, user feedback component software, etc.). Other applications can include voice recognition of predetermined voice commands that facilitate initiation of the user feedback signals. The applications 1506 can be stored in the memory 1504 and/or in a firmware 1508, and executed by the processor 1502 from either or both the memory 1504 or/and the firmware 1508. The firmware 1508 can also store startup code for execution in initializing the handset 1500. A communications component 1510 interfaces to the processor 1502 to facilitate wired/wireless communication with external systems, e.g., cellular networks, VoIP networks, and so on. Here, the communications component 1510 can also include a suitable cellular transceiver 1511 (e.g., a GSM transceiver) and/or an unlicensed transceiver 1513 (e.g., Wi-Fi, WiMax) for corresponding signal communications. The handset 1500 can be a device such as a cellular telephone, a PDA with mobile communications capabilities, and messaging-centric devices. The communications component 1510 also facilitates communications reception from terrestrial radio networks (e.g., broadcast), digital satellite radio networks, and Internet-based radio services networks The handset 1500 includes a display 1512 for displaying text, images, video, telephony functions (e.g., a Caller ID function), setup functions, and for user input. For example, the display 1512 can also be referred to as a "screen" that can accommodate the presentation of multimedia content (e.g., music metadata, messages, wallpaper, graphics, etc.). The display 1512 can also display videos and can facilitate the generation, editing and sharing of video quotes. A serial I/O interface 1514 is provided in communication with the processor 1502 to facilitate wired and/or wireless serial communications (e.g., USB, and/or IEEE 1594) through a hardwire connection, and other serial input devices (e.g., a keyboard, keypad, and mouse). This supports updating and troubleshooting the handset 1500, for example. Audio capabilities are provided with an audio I/O component 1516, which can include a speaker for the output of audio signals related to, for example, indication that the user pressed the proper key or key combination to initiate the user feedback signal. The audio I/O component 1516 also facilitates the input of audio signals through a microphone to record data and/or telephony voice data, and for inputting voice signals for telephone conversations.

The handset 1500 can include a slot interface 1518 for accommodating a SIC (Subscriber Identity Component) in the form factor of a card Subscriber Identity Module (SIM) or universal SIM 1520, and interfacing the SIM card 1520 with the processor 1502. However, it is to be appreciated that the SIM card 1520 can be manufactured into the handset 1500, and updated by downloading data and software.

The handset 1500 can process IP data traffic through the communications component 1510 to accommodate IP traffic from an IP network such as, for example, the Internet, a corporate intranet, a home network, a person area network, etc., through an ISP or broadband cable provider. Thus, VoIP traffic can be utilized by the handset 1500 and IP-based multimedia content can be received in either an encoded or a decoded format.

A video processing component 1522 (e.g., a camera) can be provided for decoding encoded multimedia content. The video processing component 1522 can aid in facilitating the generation, editing, and sharing of video quotes. The handset 1500 also includes a power source 1524 in the form of batteries and/or an AC power subsystem, which power source 1524 can interface to an external power system or charging equipment (not shown) by a power I/O component 1526.

The handset 1500 can also include a video component 1530 for processing video content received and, for recording and transmitting video content. For example, the video component 1530 can facilitate the generation, editing and sharing of video quotes. A location tracking component 1532 facilitates geographically locating the handset 1500. As described hereinabove, this can occur when the user initiates the feedback signal automatically or manually. A user input component 1534 facilitates the user initiating the quality feedback signal. The user input component 1534 can also facilitate the generation, editing and sharing of video quotes. The user input component 1534 can include such conventional input device technologies such as a keypad, keyboard, mouse, stylus pen, and/or touch screen, for example.

Referring again to the applications 1506, a hysteresis component 1536 facilitates the analysis and processing of hysteresis data, which is utilized to determine when to associate with the access point. A software trigger component 1538 can be provided that facilitates triggering of the hysteresis component 1536 when the Wi-Fi transceiver 1513 detects the beacon of the access point. A SIP client 1540 enables the handset 1500 to support SIP protocols and register the subscriber with the SIP registrar server. The applications 1506 can also include a client 1542 that provides at least the capability of discovery, play and store of multimedia content, for example, music.

The handset 1500, as indicated above related to the communications component 1510, includes an indoor network radio transceiver 1513 (e.g., Wi-Fi transceiver). This function supports the indoor radio link, such as IEEE 802.11, for the dual-mode GSM handset 1500. The handset 1500 can accommodate at least satellite radio services through a handset that can combine wireless voice and digital radio chipsets into a single handheld device.

Figure 16:
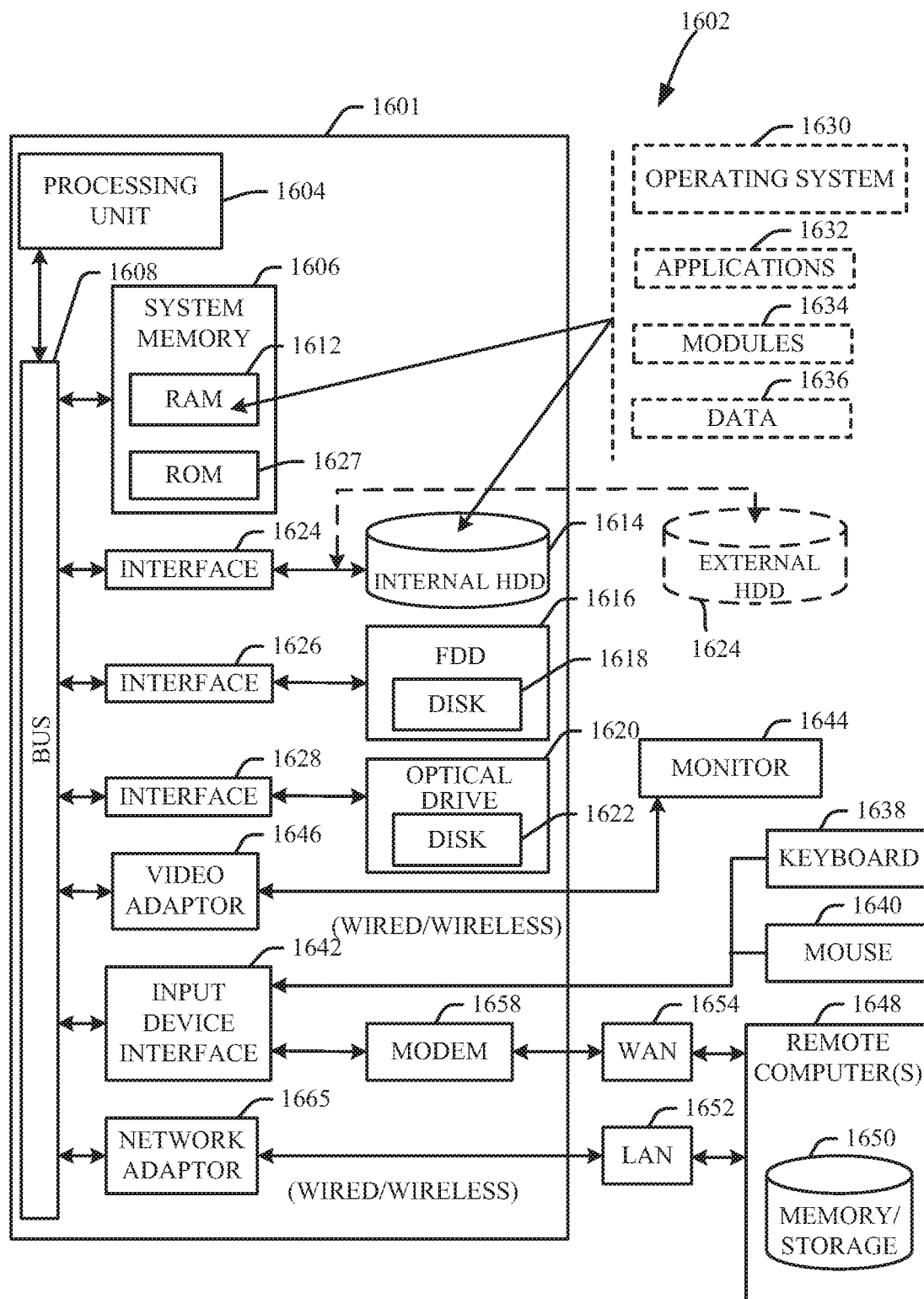
FIG. 16 illustrates an example block diagram of an example computer operable to engage in a system architecture that facilitates wireless communications according to one or more embodiments described herein.

Referring now to FIG. 16, illustrated is an example block diagram of an example computer 1600 operable to engage in a system architecture that facilitates wireless communications according to one or more embodiments described herein. The computer 1600 can provide networking and communication capabilities between a wired or wireless communication network and a server (e.g., Microsoft server) and/or communication device. In order to provide additional context for various aspects thereof, FIG. 16 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules, or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

The techniques described herein can be applied to any device or set of devices (machines) capable of running programs and processes. It can be understood, therefore, that servers including physical and/or virtual machines, personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below with reference to FIG. 16 is but one example of a computing device.

In order to provide a context for the various aspects of the disclosed subject matter, FIG. 16 and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1620 (see below), non-volatile memory 1622 (see below), disk storage 1624 (see below), and memory storage 1646 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 16 illustrates a block diagram of a computing system 1600 operable to execute the disclosed systems and methods in accordance with an embodiment. Computer 1612, which can be, for example, part of the hardware of system 1620, includes a processing unit 1614, a system memory 1616, and a system bus 1618. System bus 1618 couples system components including, but not limited to, system memory 1616 to processing unit 1614. Processing unit 1614 can be any of various available processors. Dual microprocessors and other multiprocessor architectures also can be employed as processing unit 1614.

System bus 1618 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

System memory 1616 can include volatile memory 1620 and nonvolatile memory 1622. A basic input/output system (BIOS), containing routines to transfer information between elements within computer 1612, such as during start-up, can be stored in nonvolatile memory 1622. By way of illustration, and not limitation, nonvolatile memory 1622 can include ROM, PROM, EPROM, EEPROM, or flash memory. Volatile memory 1620 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1612 can also include removable/non-removable, volatile/non-volatile computer storage media. FIG. 16 illustrates, for example, disk storage 1624. Disk storage 1624 includes, but is not limited to, devices like a magnetic disk drive, floppy disk drive, tape drive, flash memory card, or memory stick. In addition, disk storage 1624 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1624 to system bus 1618, a removable or non-removable interface is typically used, such as interface 1626.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. For the avoidance of doubt, the term "computer-readable storage device" is used and defined herein to exclude transitory media. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 16 describes software that acts as an intermediary between users and computer resources described in suitable operating environment 1600. Such software includes an operating system 1628. Operating system 1628, which can be stored on disk storage 1624, acts to control and allocate resources of computer system 1612. System applications 1630 take advantage of the management of resources by operating system 1628 through program modules 1632 and program data 1634 stored either in system memory 1616 or on disk storage 1624. It is to be noted that the disclosed subject matter can be implemented with various operating systems or combinations of operating systems.

A user can enter commands or information into computer 1612 through input device(s) 1636. As an example, a mobile device and/or portable device can include a user interface embodied in a touch sensitive display panel allowing a user to interact with computer 1612. Input devices 1636 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1614 through system bus 1618 by way of interface port(s) 1638. Interface port(s) 1638 include, for example, a serial port, a parallel port, a game port, a universal serial bus (USB), an infrared port, a Bluetooth port, an IP port, or a logical port associated with a wireless service, etc. Output device(s) 1640 and a move use some of the same type of ports as input device(s) 1636.

Thus, for example, a USB port can be used to provide input to computer 1612 and to output information from computer 1612 to an output device 1640. Output adapter 1642 is provided to illustrate that there are some output devices 1640 like monitors, speakers, and printers, among other output devices 1640, which use special adapters. Output adapters 1642 include, by way of illustration and not limitation, video and sound cards that provide means of connection between output device 1640 and system bus 1618. It should be noted that other devices and/or systems of devices provide both input and output capabilities such as remote computer(s) 1644.

Computer 1612 can operate in a networked environment using logical connections to one or more remote computers, such as remote computer(s) 1644. Remote computer(s) 1644 can be a personal computer, a server, a router, a network PC, cloud storage, cloud service, a workstation, a microprocessor based appliance, a peer device, or other common network node and the like, and typically includes many or all of the elements described relative to computer 1612.

For purposes of brevity, only a memory storage device 1646 is illustrated with remote computer(s) 1644. Remote computer(s) 1644 is logically connected to computer 1612 through a network interface 1648 and then physically connected by way of communication connection 1650. Network interface 1648 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit-switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1650 refer(s) to hardware/software employed to connect network interface 1648 to bus 1618. While communication connection 1650 is shown for illustrative clarity inside computer 1612, it can also be external to computer 1612. The hardware/software for connection to network interface 1648 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:
1. A method, comprising:
   determining, by network equipment comprising a processor, a change in channel estimation performance based on a channel estimation estimated by a user equipment relative to a previous channel estimation performance, wherein the channel estimation is based on a first resource block comprising a first density of demodulation reference signals; and
   in response to determining the change in the channel estimation performance and determining that the first density has not reached a density limit, communicating, by the network equipment to the user equipment, a second resource block comprising a second density of demodulation reference signals, wherein the second density is different than the first density.

2. The method of claim 1, wherein the second density is higher than the first density.

3. The method of claim 2, wherein determining the change in the channel estimation performance comprises determining that a counter, maintained in association with hybrid automatic repeat request acknowledgments and hybrid automatic repeat request negative acknowledgments for the first density of demodulation reference signals received from the user equipment, satisfies a function of a threshold, thereby being indicative of a reduced performance of the channel estimation relative to the previous channel estimation performance.

4. The method of claim 3, wherein the function of the threshold being satisfied is indicative of a defined number of the hybrid automatic repeat request negative acknowledgments within a period of time.

5. The method of claim 1, wherein the second density is lower than the first density.

6. The method of claim 5, wherein determining the change in the channel estimation performance comprises determining that a counter, maintained in association with hybrid automatic repeat request acknowledgments and hybrid automatic repeat request negative acknowledgments for the first density of demodulation reference signals received from the user equipment, satisfies a function of a threshold, thereby being indicative of an increased performance of the channel estimation relative to the previous channel estimation performance.

7. The method of claim 6, wherein the function of the threshold being satisfied is indicative of a defined number of the hybrid automatic repeat request acknowledgments within a period of time.

8. Network equipment, comprising:
a processor; and
a memory that stores executable instructions that, when executed by the processor, facilitate performance of operations, comprising:
determining a change in channel estimation performance based on a channel estimation estimated by a device relative to a previous channel estimation performance, wherein the channel estimation is based on a first resource block comprising a first density of demodulation reference signals; and
in response to determining the change in the channel estimation performance and determining that the first density has not reached a density limit, transmitting, to the device, a second resource block comprising a second density of demodulation reference signals, wherein the second density is different than the first density.

9. The network equipment of claim 8, wherein the second density is greater than the first density.

10. The network equipment of claim 9, wherein determining the change in the channel estimation performance comprises determining that a counter, maintained in association with hybrid automatic repeat request acknowledgments and hybrid automatic repeat request negative acknowledgments for the first density of demodulation reference signals received from the device, satisfies a function of a threshold, thereby being indicative of a reduced performance of the channel estimation relative to the previous channel estimation performance.

11. The network equipment of claim 10, wherein the function of the threshold being satisfied is indicative of a defined number of the hybrid automatic repeat request negative acknowledgments within a period of time.

12. The network equipment of claim 8, wherein the second density is less than the first density.

13. The network equipment of claim 12, wherein determining the change in the channel estimation performance comprises determining that a counter, maintained in association with hybrid automatic repeat request acknowledgments and hybrid automatic repeat request negative acknowledgments for the first density of demodulation reference signals received from the device, satisfies a function of a threshold, thereby being indicative of an increased performance of the channel estimation relative to the previous channel estimation performance.

14. The network equipment of claim 13, wherein the function of the threshold being satisfied is indicative of a defined number of the hybrid automatic repeat request acknowledgments within a period of time.

15. A non-transitory machine-readable medium, comprising executable instructions that, when executed by a processor, facilitate performance of operations, comprising:
identifying a change in channel estimation performance based on a channel estimation estimated by a user equipment relative to a previous channel estimation performance, wherein the channel estimation is based on a first resource block comprising a first density of demodulation reference signals; and
in response to identifying the change in the channel estimation performance and determining that the first density has not reached a density limit, sending, to the user equipment, a second resource block comprising a second density of demodulation reference signals, wherein the second density is different than the first density.

16. The non-transitory machine-readable medium of claim 15, wherein the second density is higher than the first density.

17. The non-transitory machine-readable medium of claim 16, wherein identifying the change in the channel estimation performance comprises determining that a counter, maintained in association with hybrid automatic repeat request acknowledgments and hybrid automatic repeat request negative acknowledgments for the first density of demodulation reference signals received from the user equipment, satisfies a function of a threshold, thereby being indicative of a reduced performance of the channel estimation relative to the previous channel estimation performance.

18. The non-transitory machine-readable medium of claim 17, wherein the function of the threshold being satisfied is indicative of a defined number of the hybrid automatic repeat request negative acknowledgments within a period of time.

19. The non-transitory machine-readable medium of claim 15, wherein the second density is lower than the first density.

20. The non-transitory machine-readable medium of claim 19, wherein identifying the change in the channel estimation performance comprises determining that a counter, maintained in association with hybrid automatic repeat request acknowledgments and hybrid automatic repeat request negative acknowledgments for the first density of demodulation reference signals received from the user equipment, satisfies a function of a threshold, thereby being indicative of an increased performance of the channel estimation relative to the previous channel estimation performance.

* * * * *